United States Patent
Hutton et al.

(10) Patent No.: US 9,729,513 B2
(45) Date of Patent: Aug. 8, 2017

(54) USING MULTIPLE LAYERS OF POLICY MANAGEMENT TO MANAGE RISK

(71) Applicant: Glasswall (IP) Limited, London (GB)

(72) Inventors: Samuel Harrison Hutton, Herts (GB); Leon Maurice Shirk, Stanmore (GB)

(73) Assignee: GLASSWALL (IP) LIMITED, London (GB)

( * ) Notice: Subject to any disclaimer, the term of this patent is extended or adjusted under 35 U.S.C. 154(b) by 0 days.

(21) Appl. No.: 14/825,808

(22) Filed: Aug. 13, 2015

(65) Prior Publication Data

US 2017/0048199 A1 Feb. 16, 2017
US 2017/0149735 A9 May 25, 2017

(51) Int. Cl.
*H04L 29/06* (2006.01)
*G06F 21/51* (2013.01)
*G06F 21/56* (2013.01)
*G06F 21/64* (2013.01)
*G06F 17/30* (2006.01)

(52) U.S. Cl.
CPC .... *H04L 63/0263* (2013.01); *G06F 17/30109* (2013.01); *G06F 21/51* (2013.01); *G06F 21/564* (2013.01); *G06F 21/565* (2013.01); *G06F 21/64* (2013.01); *H04L 63/101* (2013.01); *H04L 63/145* (2013.01); *H04L 63/20* (2013.01)

(58) Field of Classification Search
CPC .............................. H04L 63/0263; G06F 21/56
See application file for complete search history.

(56) References Cited

U.S. PATENT DOCUMENTS

| | | | |
|---|---|---|---|
| 5,050,212 | A | 9/1991 | Dyson |
| 5,649,095 | A | 7/1997 | Cozza |
| 5,655,130 | A | 8/1997 | Dodge et al. |
| 5,745,897 | A | 4/1998 | Perkins et al. |
| 5,832,208 | A | 11/1998 | Chen et al. |
| 5,951,698 | A | 9/1999 | Chen et al. |
| 6,144,934 | A | 11/2000 | Stockwell et al. |
| 6,336,124 | B1 | 1/2002 | Alam et al. |
| 6,401,210 | B1 | 6/2002 | Templeton |
| 6,493,761 | B1 | 12/2002 | Baker et al. |
| 6,697,950 | B1 | 2/2004 | Ko |
| 6,807,632 | B1 | 10/2004 | Carpentier et al. |

(Continued)

FOREIGN PATENT DOCUMENTS

| | | |
|---|---|---|
| DE | 10235819 A1 | 2/2004 |
| EP | 0751643 A1 | 1/1997 |

(Continued)

OTHER PUBLICATIONS

Apr. 13, 2006 Search Report in connection with European patent application No. GB0511749.4.

(Continued)

*Primary Examiner* — Dao Ho
(74) *Attorney, Agent, or Firm* — Marger Johnson

(57) ABSTRACT

A system for processing a file using a file issue exclusion policy to manage risk is disclosed. If a file does not conform to a set of rules and would otherwise be quarantined, a file issue exclusion policy can be reviewed. If the file issue exclusion policy indicates that the reason why the file did not conform to the set of rules is acceptable, the file can be delivered to the recipient despite not conforming to the set of rules.

17 Claims, 16 Drawing Sheets

(56) References Cited

U.S. PATENT DOCUMENTS

| | | | |
|---|---|---|---|
| 6,922,827 B2 | 7/2005 | Vasilik et al. | |
| 7,093,135 B1 | 8/2006 | Radatti et al. | |
| 7,225,181 B2 | 5/2007 | Tsuda | |
| 7,240,279 B1 | 7/2007 | Chartier et al. | |
| 7,269,733 B1 | 9/2007 | O'Toole, Jr. | |
| 7,496,963 B2 | 2/2009 | Shipp | |
| 7,607,172 B2 | 10/2009 | Zurko et al. | |
| 7,636,856 B2 | 12/2009 | Gheorghescu et al. | |
| 7,664,754 B2 | 2/2010 | Shipp | |
| 7,685,174 B2 | 3/2010 | Koestler | |
| 7,756,834 B2 | 7/2010 | Masters et al. | |
| 8,185,954 B2 | 5/2012 | Scales | |
| 8,533,840 B2 | 9/2013 | Redlich et al. | |
| 8,683,584 B1 | 3/2014 | Daswani et al. | |
| 8,869,283 B2 | 10/2014 | Scales | |
| 2002/0004908 A1 | 1/2002 | Galea | |
| 2002/0072926 A1 | 6/2002 | Morita et al. | |
| 2002/0073330 A1 | 6/2002 | Chandnani et al. | |
| 2002/0174185 A1 | 11/2002 | Rawat et al. | |
| 2002/0178396 A1 | 11/2002 | Wong et al. | |
| 2002/0184555 A1 | 12/2002 | Wong et al. | |
| 2003/0046128 A1 | 3/2003 | Heinrich | |
| 2003/0079142 A1 | 4/2003 | Margalit et al. | |
| 2003/0079158 A1 | 4/2003 | Tower et al. | |
| 2003/0120949 A1 | 6/2003 | Redlich et al. | |
| 2003/0145213 A1 | 7/2003 | Carbone | |
| 2003/0163732 A1 | 8/2003 | Parry | |
| 2003/0163799 A1 | 8/2003 | Vasilik et al. | |
| 2003/0196104 A1 | 10/2003 | Baber et al. | |
| 2003/0229810 A1 | 12/2003 | Bango | |
| 2003/0236921 A1 | 12/2003 | Cordery et al. | |
| 2004/0008368 A1 | 1/2004 | Plunkett et al. | |
| 2004/0049687 A1 | 3/2004 | Orsini et al. | |
| 2004/0054498 A1 | 3/2004 | Shipp | |
| 2004/0064515 A1 | 4/2004 | Hockey | |
| 2004/0107386 A1 | 6/2004 | Burdick et al. | |
| 2004/0181543 A1 | 9/2004 | Wu et al. | |
| 2004/0199594 A1 | 10/2004 | Radatti et al. | |
| 2004/0230903 A1 | 11/2004 | Elza et al. | |
| 2005/0071477 A1 | 3/2005 | Evans et al. | |
| 2005/0081057 A1 | 4/2005 | Cohen et al. | |
| 2005/0108554 A1 | 5/2005 | Rubin et al. | |
| 2005/0132206 A1* | 6/2005 | Palliyil | G06F 21/566 713/188 |
| 2005/0132227 A1 | 6/2005 | Reasor et al. | |
| 2005/0138110 A1 | 6/2005 | Redlich et al. | |
| 2005/0149720 A1 | 7/2005 | Gruper et al. | |
| 2005/0193070 A1 | 9/2005 | Brown et al. | |
| 2005/0198691 A1 | 9/2005 | Xiang et al. | |
| 2005/0246159 A1 | 11/2005 | Perla et al. | |
| 2005/0278318 A1 | 12/2005 | Vasilik et al. | |
| 2006/0015747 A1 | 1/2006 | Van de Ven | |
| 2006/0037079 A1 | 2/2006 | Midgley | |
| 2006/0044605 A1 | 3/2006 | Schneider et al. | |
| 2006/0095971 A1 | 5/2006 | Costea et al. | |
| 2006/0195451 A1 | 8/2006 | Smith et al. | |
| 2006/0230451 A1 | 10/2006 | Kramer et al. | |
| 2006/0230452 A1 | 10/2006 | Field | |
| 2007/0067397 A1 | 3/2007 | Tran | |
| 2007/0079379 A1 | 4/2007 | Sprosts et al. | |
| 2007/0083929 A1 | 4/2007 | Sprosts et al. | |
| 2007/0150948 A1 | 6/2007 | De Spiegeleer | |
| 2007/0277238 A1 | 11/2007 | Margalit et al. | |
| 2009/0138573 A1* | 5/2009 | Campbell | G06F 21/554 709/218 |
| 2009/0138972 A1 | 5/2009 | Scales | |
| 2009/0178144 A1 | 7/2009 | Redlich et al. | |
| 2009/0210936 A1 | 8/2009 | Omar et al. | |
| 2009/0254572 A1 | 10/2009 | Redlich et al. | |
| 2009/0254992 A1 | 10/2009 | Schultz et al. | |
| 2009/0296657 A1 | 12/2009 | Omar et al. | |
| 2010/0054278 A1 | 3/2010 | Stolfo et al. | |
| 2010/0153507 A1 | 6/2010 | Wei et al. | |
| 2010/0154063 A1* | 6/2010 | Hutton | G06F 21/562 726/24 |
| 2011/0213783 A1 | 9/2011 | Keith, Jr. | |
| 2011/0219450 A1 | 9/2011 | McDougal et al. | |
| 2011/0314152 A1* | 12/2011 | Loder | G06F 17/30887 709/225 |
| 2012/0110667 A1* | 5/2012 | Zubrilin | G06F 21/56 726/24 |
| 2013/0006701 A1 | 1/2013 | Guven et al. | |
| 2013/0326624 A1 | 12/2013 | Hutton et al. | |
| 2015/0101011 A1 | 4/2015 | Hutton | |
| 2015/0215332 A1 | 7/2015 | Curcic et al. | |

FOREIGN PATENT DOCUMENTS

| | | |
|---|---|---|
| EP | 1022639 A2 | 7/2000 |
| EP | 1122932 A2 | 8/2001 |
| EP | 1180880 A1 | 2/2002 |
| EP | 1560112 A1 | 8/2005 |
| EP | 1657662 A2 | 5/2006 |
| GB | 2357939 A | 7/2001 |
| GB | 2427048 A | 12/2006 |
| GB | 2444514 A | 6/2008 |
| JP | 11224190 | 8/1999 |
| JP | 2000222202 | 8/2000 |
| JP | 2002259187 | 9/2002 |
| JP | 2006127497 | 5/2006 |
| WO | 0126004 A2 | 4/2001 |
| WO | 03/017141 A1 | 2/2003 |
| WO | 2004/107684 A1 | 12/2004 |
| WO | 2005/008457 A1 | 1/2005 |
| WO | 2006/047163 A2 | 5/2006 |

OTHER PUBLICATIONS

Apr. 16, 2012 European official action in connection with European patent application No. 06744158.4.

Canadian official action dated Feb. 21, 2013 in corresponding Canadian application No. 2,611,227.

"Checking of Incoming Files for Macro Viruses," Online 2004, retrieved from the Internet: http://www.bsi.de/english/gshb/manuals/s04044.html.

English translation of Mar. 21, 2012 Japanese official action in connection with a counterpart JP application.

Feb. 15, 2011 official action in connection with European patent application No. 06744158.4.

Great Britain search report in connection with Great Britain patent application No. GB624224.2.

"MailStreet Features and Benefits," Apr. 22, 2004, retrieved from the Internet: http://web.archive.org/web/2004042104456/http://www.mailstreet.com/defender/features.asp.

Oct. 21, 2005 search report in connection with counterpart British patent application No. GB0511749.4.

Oct. 4, 2006 International Search Report in connection with international application No. PCT/GB2006/002107.

Saito, Tado, et al. (1993) "Protection Against Trojan Horses by Source Code Analysis," Electronics and Communication in Japan-Fundamental Electronic Science, Part 3, vol. 77, No. 1, pp. 11-18.

Salamone, Salvatore (1992), "A Magic Bullet for Netware Viruses. Untouchable Network NLM Can Detect and Eliminate Known and Unknown Viruses from Netware Servers," Data Communications, vol. 21, pp. 45-46.

Sep. 13, 2011 Japanese official action in connection with counterpart Japanese patent application No. 2008-515291.

Liang et al., Isolated Program Execution: An Application Transparent Approach for Executing Untrusted Programs, 2003, IEEE.

D'Anna et al., Self-Protecting Mobile Agents Obfuscation Report, Jun. 30, 2003, Network Associates Laboratories, pp. 1-67.

Martinez et al., Optimal XOR Hashing for a Linearly Distributed Address Lookup in Computer Networks, Oct. 2005, Department of Electrical and Computer Engineering, pp. 203-210.

Hess et al., Aug. 2004, ACM, vol. 7, No. 3, pp. 428-456.

Glasswall Solutions Ltd., 2013, "What it Does" glasswallsolutions.com, available from http://web.archive/org/web/20130116065146/http://www.glasswallsolutions.com/what-it-does, dated Jan. 16, 2013, 1 page.

(56) References Cited

OTHER PUBLICATIONS

Glasswall Solutions Ltd., 2013, "Where it fits" glasswallsolutions.com, available from http://web.archive/org/web/2013011606502/http://www.glasswallsolutions.com/where-it-fits, dated Jan. 16, 2013, 1 page.
International Search Report and Written Opinion, PCT/GB2014/052967, Feb. 3, 2015, 14 pages.
Glasswall Solutions Ltd., 2012, "How it Works," glasswallsolutions.com, available from http://web.archive/org/web/20121015004110/http://www.glasswallsolutions.com/how-it-works, dated Oct. 15, 2012, 1 page.
UK Search Report and Examination Opinion for Application No. GB1317607.8, dated Feb. 21, 2014, 8 pages.
International Search Report and Written Opinion, PCT/EP2016/068824, Oct. 6, 2016, 12 pages.

* cited by examiner

File Type Policy — 115

405

| File Type | Action |
|---|---|
| doc  410 | Allow  415 |
| docx | Allow |
| gif | Allow |
| jpeg | Allow |
| jpg | Allow |
| pdf | Allow |
| png | Allow |
| ppt | Allow |
| pptx | Allow |
| xls | Allow |
| xlsx | Allow |
| exe  420 | Disallow  425 |

FIG. 4

Figure 5:
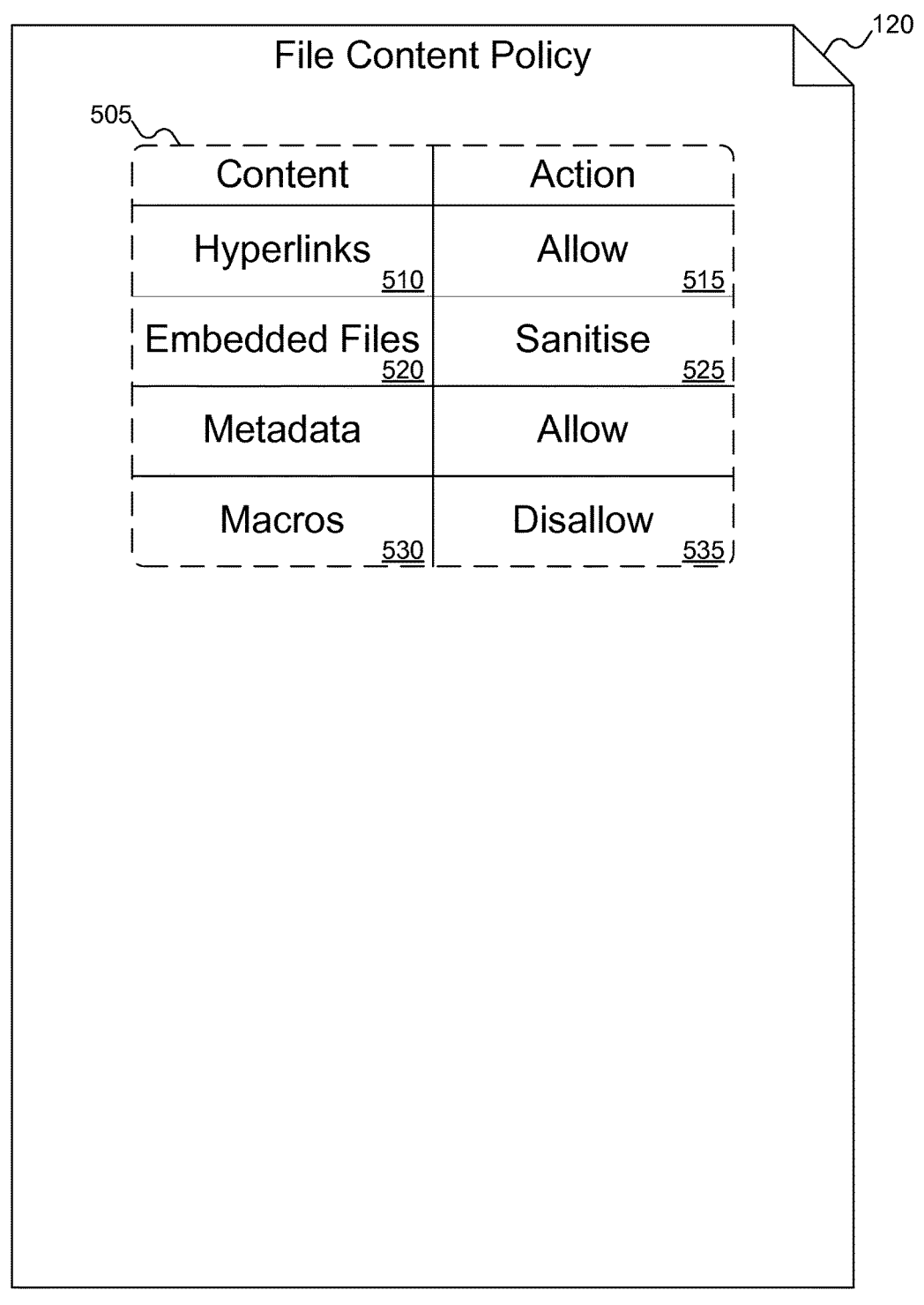

File Content Policy ~120

| Content | Action |
|---|---|
| Hyperlinks 510 | Allow 515 |
| Embedded Files 520 | Sanitise 525 |
| Metadata | Allow |
| Macros 530 | Disallow 535 |

Issue Exclusion Policy — 125

Approved List — 805

| File Type | Issue ID |
|---|---|
| pdf  815 | B070645  830 |

Blocked List — 810

| File Type | Issue ID |
|---|---|
| docx  820 | 1  825 |
| gif | 1 |
| jpg | 1 |
| pdf | 1 |
| png | 1 |
| ppt | 34A024D |
| pptx | 1 |
| xls | 23F0121 |
| xlsx | 1 |

FIG. 8

USING MULTIPLE LAYERS OF POLICY MANAGEMENT TO MANAGE RISK

RELATED APPLICATION DATA

This application is related to U.S. patent application Ser. No. 14/504,844, filed Oct. 2, 2014, which is a continuation of U.S. patent application Ser. No. 13/438,933, filed Apr. 4, 2012, now U.S. Pat. No. 8,869,283, issued Oct. 21, 2014, which is a continuation of U.S. patent application Ser. No. 11/915,125, filed Jun. 17, 2008, now U.S. Pat. No. 8,185,954, issued May 22, 2012, which is a National Stage Entry of PCT Application No. PCT/GB2006/002107, filed Jun. 9, 2006, which claims priority from GB Patent Application No. 0511749.4, filed Jun. 9, 2005, all of which are hereby incorporated by reference.

This application is a continuation-in-part of U.S. patent application Ser. No. 14/715,300 filed May 18, 2015, now pending, which is a divisional of U.S. patent application Ser. No. 13/899,043, filed May 21, 2013, now U.S. Pat. No. 9,038,174, issued May 19, 2015, which is a continuation of U.S. patent application Ser. No. 12/517,614, filed Feb. 5, 2010, now U.S. Pat. No. 8,533,824, issued Sep. 10, 2013, which is a National Stage Entry of PCT Application No. PCT/GB2007/004258, filed Nov. 8, 2007, which claims priority from GB Patent Application No. 0624224.2, filed Dec. 4, 2006, all of which are hereby incorporated by reference.

FIELD

The invention pertains to message security, and more particularly to policies that can adjust security risk.

BACKGROUND

Message security has been an important factor in computer systems for years. Initially, anti-virus programs ran on individual computers, protecting against individual files that were loaded into memory. Because each computer needed its own copy of the anti-virus program, computers without anti-virus programs could be compromised even in the face of corporate policy to the contrary.

Over time, server anti-virus programs become available. Such programs could theoretically protect an entire company's network against viruses by scanning all the files on all network-attached computers. But server anti-virus programs had a weakness: they could only scan files on computers on the network. This meant that if a computer was disconnected from the network, that computer could be infected with a virus.

As e-mail became a more prominent tool, other threats arose. A file could enter the network as an attachment to an e-mail message. If that file had a virus, the virus could infect the network. So anti-virus tools began to scan e-mail messages and attachments to e-mail messages.

Over time, new threats have emerged: web sites that could execute code in a browser and thereby infect a computer, phishing websites and messages (which attempted to persuade a person to part voluntarily with sensitive information), and so on. Anti-virus programs have kept up with the threats by becoming more sophisticated.

But anti-virus programs have traditionally relied on detecting malicious content via signatures. This technology has two weaknesses. First, anti-virus programs have to store increasing numbers of virus signatures, all of which must be considered (as once a virus has been created, it could potentially be used, potentially even years or decades after creation). Second, because anti-virus programs use signatures to detect malicious content, until a signature has been created for a particular threat, the anti-virus program cannot detect that threat.

One way anti-virus programs address threats for which signatures have not yet been created is by using heuristics. The anti-virus programs look for content that looks like a threat, even if no threat is actually known that matches the heuristic. But while heuristics can protect against content that might be an unknown threat, heuristics can also end up flagging as suspicious content that is, in fact, benign.

A need remains for a way to manage the risk associated with potentially malicious content.

BRIEF DESCRIPTION OF THE DRAWINGS

FIG. 4 shows details of the file type policy of FIG. 1.

FIG. 5 shows details of the file content policy of FIG. 1

FIG. 8 shows details of the file issue exclusion policy of FIG. 1.

DETAILED DESCRIPTION

Figure 1:
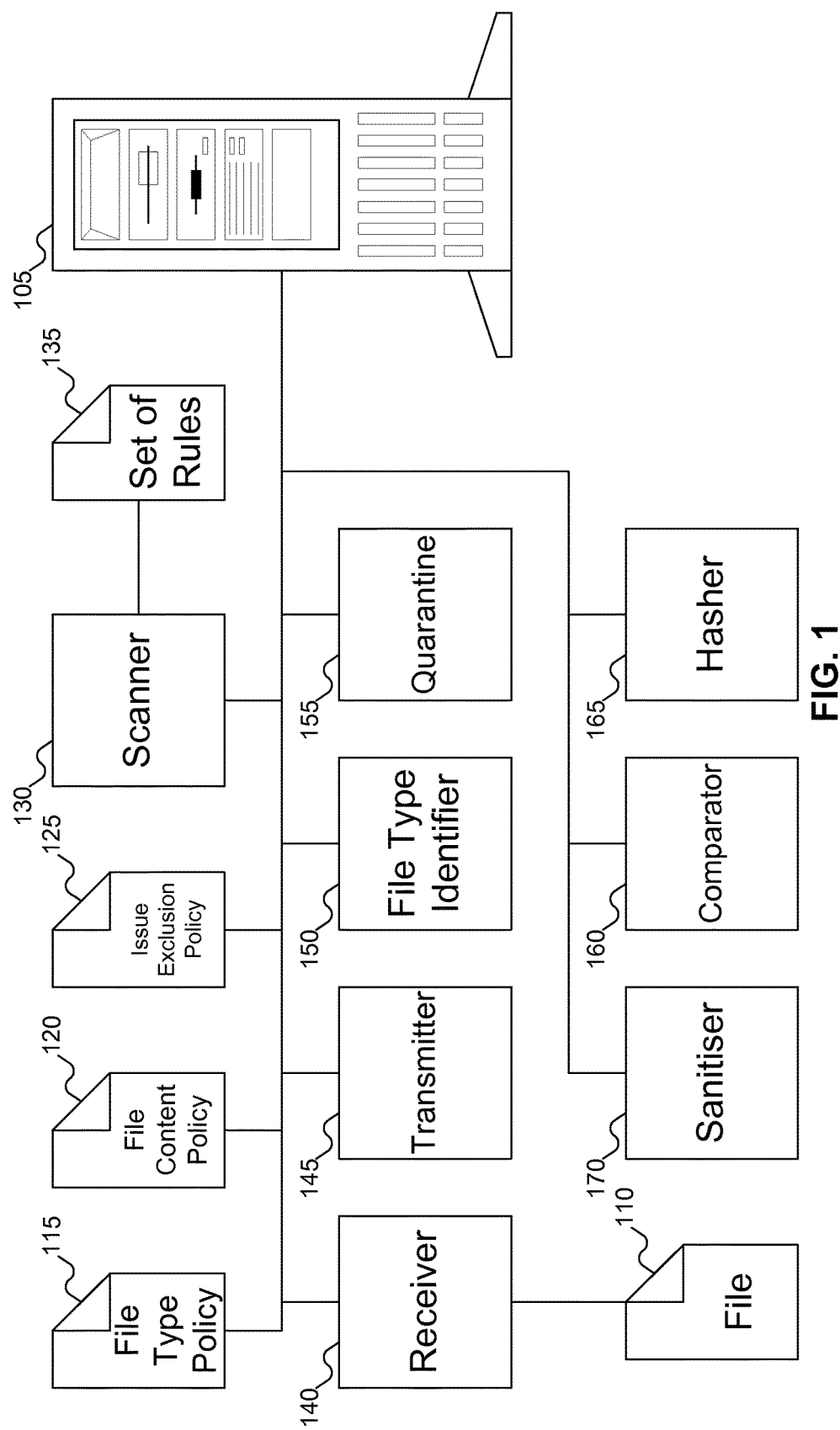
FIG. 1 shows a server equipped to use a file issue exclusion policy in managing the risk associated with potential malicious content in a file, according to an embodiment of the invention.

Traditional anti-virus programs operate by examining a file for malicious content. More particularly, traditional anti-virus programs examine the file for signatures of known viruses. But as the number of viruses increases, the number of signatures that must be searched for in the file only grows. Further, while heuristics provide some level of protection against viruses not yet known to the anti-virus developers, that protection cannot be assumed to be complete. There is always the possibility that a new virus can be designed that does not exhibit any characteristics that might be detected by the heuristics.

U.S. patent application Ser. No. 14/504,844, filed Oct. 2, 2014, now pending, which is a continuation of U.S. patent application Ser. No. 13/438,933, filed Apr. 4, 2012, now U.S.

Pat. No. 8,869,283, issued Oct. 21, 2014, which is a continuation of U.S. patent Ser. No. 11/915,125, filed Jun. 17, 2008, now U.S. Pat. No. 8,185,954, issued May 22, 2012, which is a National Stage Entry of PCT Patent Application No. PCT/GB2006/002107, filed Jun. 9, 2006, all of which are incorporated by reference, describes how a file can be examined before it is delivered to a recipient. In contrast to traditional anti-virus programs, the approach of this application does not look for signatures of known viruses or heuristics of potential viruses. Instead, this approach works by developing a set of rules that reflects what a file of a particular type should look like.

The approach starts by determining the type the file is supposed to be (the purported file type). This can be done in a number of different ways. For example, the extension of the file often identifies the purported file type: if the file extension is .pdf, the file is most likely a file in the Adobe® PDF file format, whereas if the file extension is .doc, the file is most likely a file in the Microsoft® Word file format. (Adobe and PDF are either registered trademarks or trademarks of Adobe Systems Incorporated in the United States and/or other countries. Microsoft is either registered trademarks or trademarks of Microsoft Corporation in the United States and/or other countries.) Another way to determine the purported file type is to examine the file. Some file formats include the type of the file as data (either textual or digital) within the file itself.

Once the purported file format has been determined, a set of rules associated with that file format can be identified. The set of rules specifies how the file should be formatted and its content organised. If a file does not conform to the set of the rules for the purported file type, then it is possible that the file includes malicious content.

The set of rules can also specify that certain content elements in a file can be malicious, even content elements that can conform to the rules for the file type. For example, files in the Microsoft Word file format can include macros. But macros can also be malicious. Thus, the set of rules can specify that a macro, even if it conforms to the rules for the file format, is considered potentially malicious.

Once a file has been examined, the file can be sanitised. Sanitising the file involves eliminating the portions of the file that are not conforming, leaving only the portions of the file that conform to the rules. Note that the file as a whole is not necessarily disallowed if a portion of the file does not conform to the set of rules. For example, macros can be eliminated from a document, while the text of the document can be allowed through.

To further reduce the risk of malicious content reaching the recipient, the sanitised file can be regenerated. Regenerating the file involves recreating the file: the content that was prepared by the sender can be included, and invariant parts of the file can be created by the system. For example, the basic form of a document can be generated by the system, whereas the text of the document and its formatting can be copied from the original file to the regenerated file. In this manner, any malicious content that might be included in the invariant portions of the file are eliminated.

Once the file has been sanitised and regenerated, the file can be delivered to the recipient.

An advantage of this system over traditional anti-virus technologies is that there is no concern about new viruses arising for which signatures are not yet known. Since a file that includes malicious content will not conform to the rules associated with the file type, the malicious content will be blocked, regardless of whether or not a signature can be used to detect the malicious content. But the system does include an assumption: that legitimate content will conform to the rules for the file type. If this assumption is false, then legitimate content might be blocked from being delivered to the intended recipient.

FIG. 1 shows a server equipped to use a file issue exclusion policy in managing the risk associated with potential malicious content in a file, according to an embodiment of the invention. In FIG. 1, server 105 is shown as including various components that constitute embodiments of the invention. But server 105 could be replaced with any desired computer system. For example, server 105 could be replaced with a traditional computer system including a computer, monitor, keyboard, and mouse, potentially with any other desired input/output devices or other components. Or, server 105 could be replaced with a laptop computer, a tablet computer, a personal digital assistant (PDA), or a smart phone, among other possibilities.

Not shown in FIG. 1 are the conventional internal components of server 105, such as a central processing unit, memory and other storage devices, and a network interface card (NIC). Also, although not shown in FIG. 1, a person skilled in the art will recognise that server 105 can interact with other computer systems, either directly or over a network (not shown) of any type.

Server 105 can include various components that support determining whether a file, such as file 110, might contain malicious content. These components include file type policy 115, file content policy 120, file issue exclusion policy 125, scanner 130, and set of rules 135. As described below with reference to FIGS. 4-8, file type policy 115 can be used to determine whether to disallow a file for transmission to a recipient based on its type, file content policy 120 can be used to determine how to process a portion of a file that is determined by scanner 130 not to conform to set of rules 135, and file issue exclusion policy 125 can be used to determine whether to allow a file to be delivered to the recipient despite not conforming to set of rules 135.

Other components of server 105 can include receiver 140, transmitter 145, file type identifier 150, quarantine 155, comparator 160, hasher 165, and sanitiser 170. Receiver 140 and transmitter 145 can be used to receive and transmit information. For example, if file 110 is an attachment to an e-mail message, receiver 140 can receive file 110 from a sender, and transmitter 145 can transmit file 110 to the recipient, if the file is considered safe for delivery.

File type identifier 150 can be used to identify the purported file type of file 110. File type identifier 150 can operate in a number of different ways. For example, file type identifier 150 can look at the extension of file 110 to determine its purported type. Or, file type identifier 150 can examine the data of file 110 to see if file 110 specifies its type.

Quarantine 155 can be used to store file 110, if the file is considered to contain malicious content and cannot be sanitised. Sanitiser 170 can be used to sanitise file 110: for example, by eliminating portions of the content of file 110 that are suspected to contain malicious content. Comparator 160 can be used to compare a portion of the content of file 110 with file content policy 120 to determine if the portion of content is known to be safe. And hasher 165 can be used to generate a hash of a portion of the content of file 110, in support of comparator 160.

Figure 2:
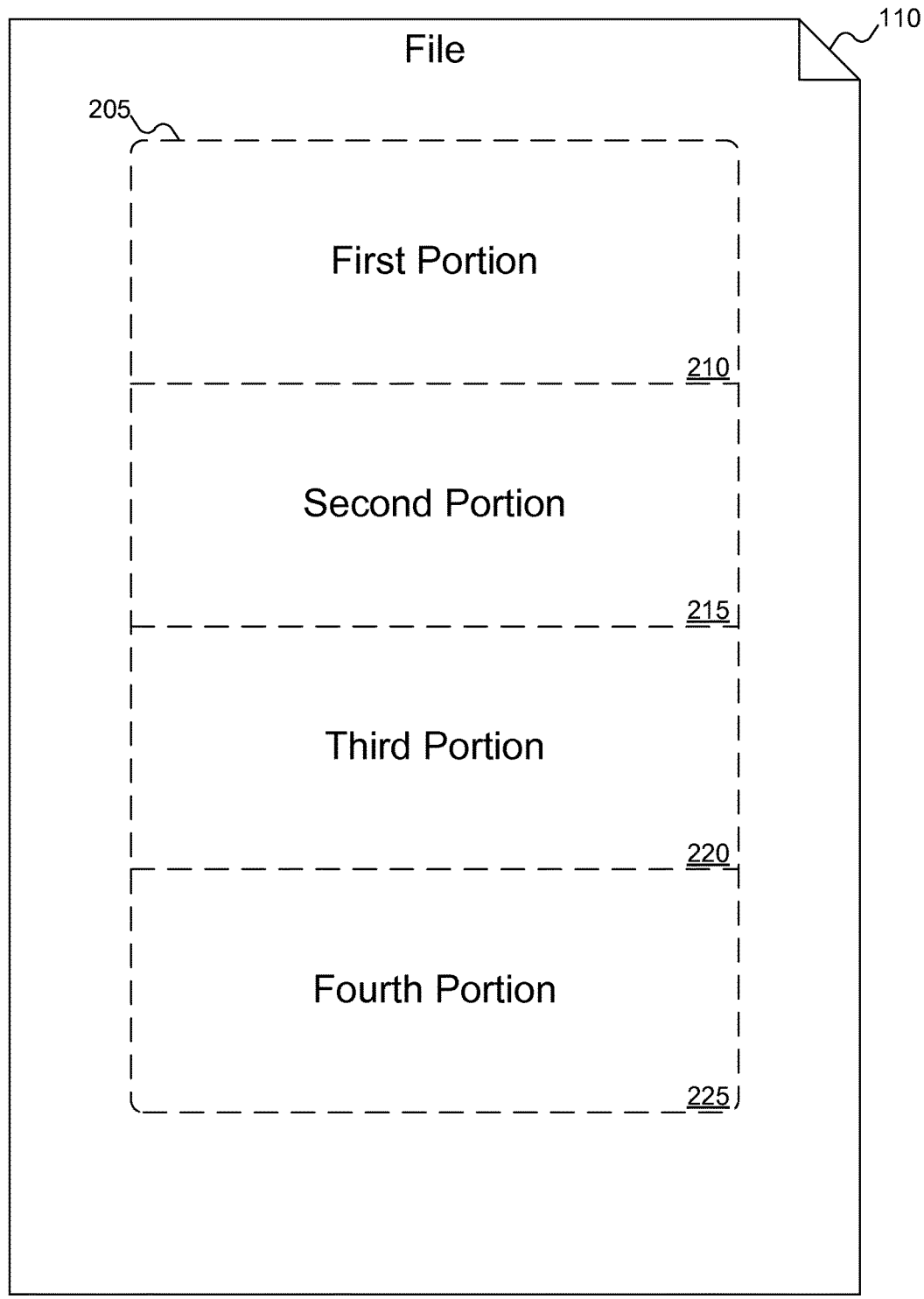
FIG. 2 shows the content of the file of FIG. 1 divided into portions.

FIG. 2 shows the content of file 110 of FIG. 1 divided into portions. In FIG. 2, file 110 is shown has having content 205. Content 205 is divided into four portions 210, 215, 220, and 225. For example, if file 110 is a word processing document, portion 210 can include header information for file 110, portion 215 can include formatting information (such as page size, margins, tab stops, fonts used in the file, and so on), portion 220 can include macros included in file 110, and portion 225 can include the text entered by the user. Each portion can be checked to see if it conforms to the rules for the purported file type independently from the other portions.

While FIG. 2 shows file 110 has having four portions, a person skilled in the art will recognise that a file can have any number of portions. Thus, one file might have four portions, another file might have one portion, a third file might have 8 portions, and so on.

Figure 3:
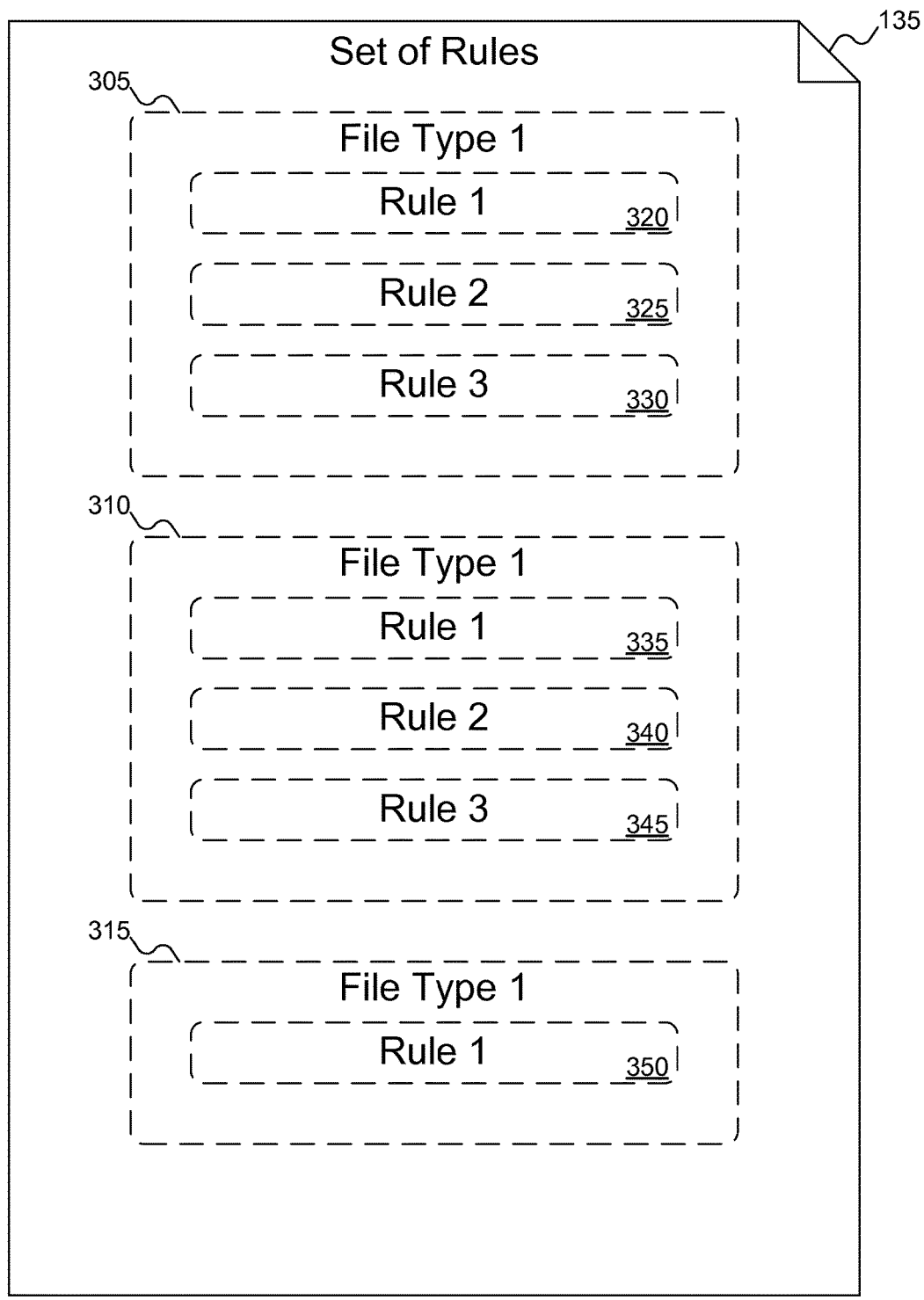
FIG. 3 shows the rules used to determine whether the file of FIG. 1 conforms to a purported file type.

FIG. 3 shows set of rules 135 used to determine whether file 110 of FIG. 1 conforms to a purported file type. In FIG. 3, set of rules 135 is shown as including rules for three different file types. For example, file type 305 might be the rules for a .pdf file, file type 310 might be the rules for a .doc file, and file type 315 might be the rules for a .xls file. Within each file type, various rules specify how to determine if the content of the file (or a portion of the content of the file) is conformal. For example, file type 305 is shown as including rules 320, 325, and 330, file type 310 is shown as including rules 335, 340, and 345, and file type 315 is shown as including rule 350.

While FIG. 3 shows three file types, each with at most three rules, a person skilled in the art will recognise that set of rules 135 can include rules for any number of file types. In addition, a person skilled in the art will recognise that, for a given file type, there can be any number of rules. For example, there might be 1000 or more rules associated with a particular file type. FIG. 3 is exemplary with respect to how set of rules 135 can be organised, and is not intended to represent the sole manner in which set of rules 135 can be organised.

FIG. 4 shows details of file type policy 115 of FIG. 1. As described above, file type policy 115 can be used to determine whether a file should be disallowed wholesale, without even examining the content of the file. In FIG. 4, file type policy 115 shows table 405, which lists various file types and whether the file type is allowed or disallowed. For example, file type doc 410 is allowed, as shown by indicator 415, whereas file type exe 420 is disallowed, as shown by indicator 425. Thus, doc type files are allowed to proceed to conformity analysis, whereas exe file types are blocked completely, without even being examined for conformity.

FIG. 5 shows details of file content policy 120 of FIG. 1. Like file type policy 115 of FIG. 4, file content policy 120 specifies how different portions of file 110 can be processed. File content policy 120 can be specific to a file type, or it can specify how to handle portions of content across multiple file types.

In FIG. 5, file content policy 120 includes table 505, which lists various different types of content, with different possible actions that can be taken. For example, hyperlinks 510 are allowed, as shown by action 515; embedded files 520 can be sanitised, as shown by action 525, and macros 530 can be disallowed, as shown by action 535. In context, sanitising content (as in action 525) involves examining the content to see if it conforms to the rules appropriate to the file type. Content in a file being sanitised that does not conform can be removed from the file. In contrast, allowing content (as in action 515) allows the content to be included automatically, without examining the content to see if it conforms to the rules for the file type. And disallowing content (as in action 535) eliminates the content from the file, without examining the content to see if it conforms to the rules for the file type.

Note that whether content is allowed, sanitised, or disallowed is, in this embodiment of the invention, independent of whether or not the content is actually malicious. That is, using file content policy 120, content can (i.e., may or may not) be malicious, and subject to sanitisation or disallowance. Thus, using file content policy 120 as shown in FIG. 5, all macros 530 would be disallowed, regardless of whether the macros are actually malicious or are benign (that is, the macro may or may not be malicious). Put a different way, content that is filtered by file content policy 120 can be content that would conform to the set of rules for the purported file type.

In another embodiment of the invention, file content policy 120 can operate by identifying how to process content that does not conform to rules for the purported file type. A file can be analysed to see if it determines with a set of rules for the file's purported file type. Then, if a portion of the content does not conform to the set of rules for that file type, file content policy 120 can be used to determine how to process the content. If file content policy 120 indicates the content is allowed, then the content can be included in the file. If file content policy 120 indicates the content is disallowed, then the file can be quarantined. And if file content policy 120 indicates that the content is to be sanitised, then the content can be eliminated from the file.

Figure 6:
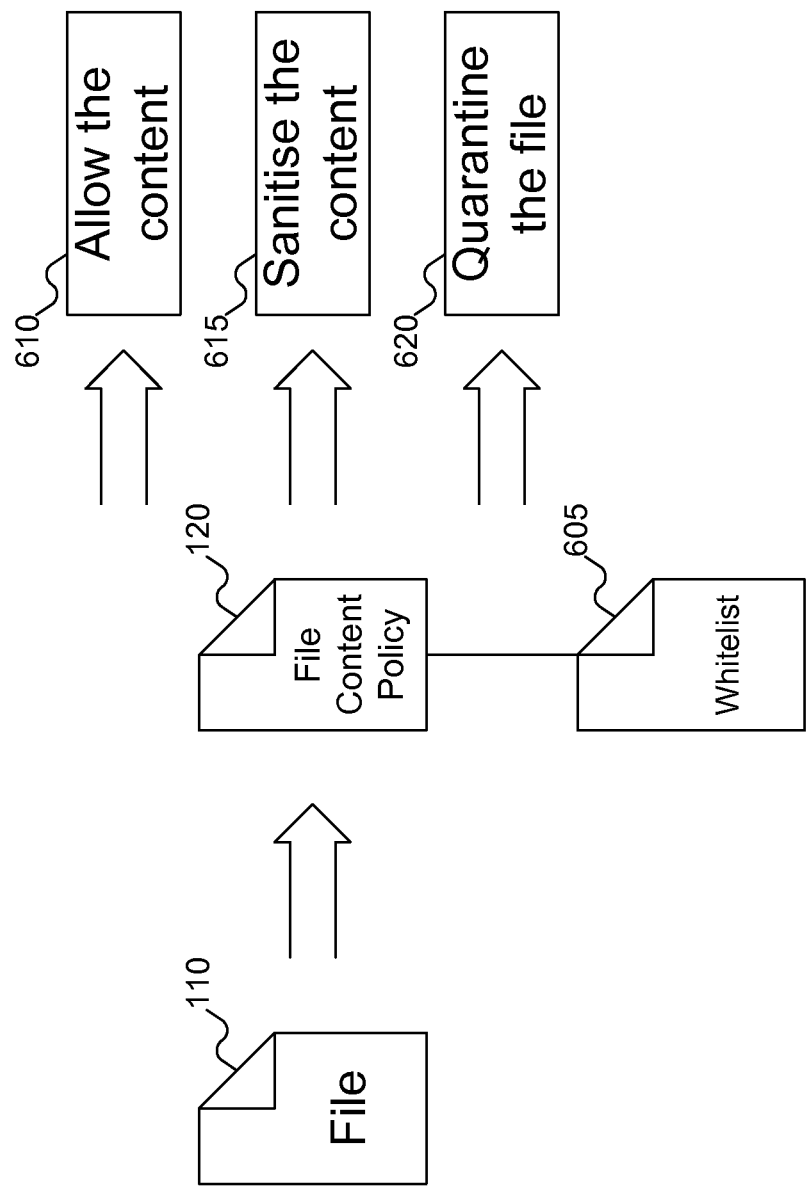
FIG. 6 shows the file content policy of FIG. 1 being used to determine how to process the file of FIG. 1.

FIG. 6 shows file content policy 120 of FIG. 1 being used to determine how to process file 110 of FIG. 1. In contrast to the embodiment of the invention shown in FIG. 5, the embodiment of the invention shown in FIG. 6 can use a whitelist to determine whether content should be allowed.

Consider macros in a spreadsheet document. In general, macros are potentially malicious, since they contain executable code. But there can be situations where macros are needed. For example, the finance group in a company might use macros in spreadsheets to manage corporate monies. If macros are outright blocked, then the finance group cannot share spreadsheets with macros; but if macros are permitted, then malicious macros might be able to penetrate the corporate network.

A solution to this problem is to use whitelist 605. Whitelist 605 can include specific pieces of content, such as particular macros, that are considered safe. If the content in file 110 is in whitelist 605, then the content is considered safe, and can be included for delivery to the intended recipient; if the content in file 110 is not in whitelist 605, then the content can be sanitised from the file.

File content policy 120 can then use whitelist 605 to decide what to do with particular content from file 110. File content policy 120 can specify that the content should be allowed (action 610), sanitised (action 615), or quarantined (action 620).

Figure 7:
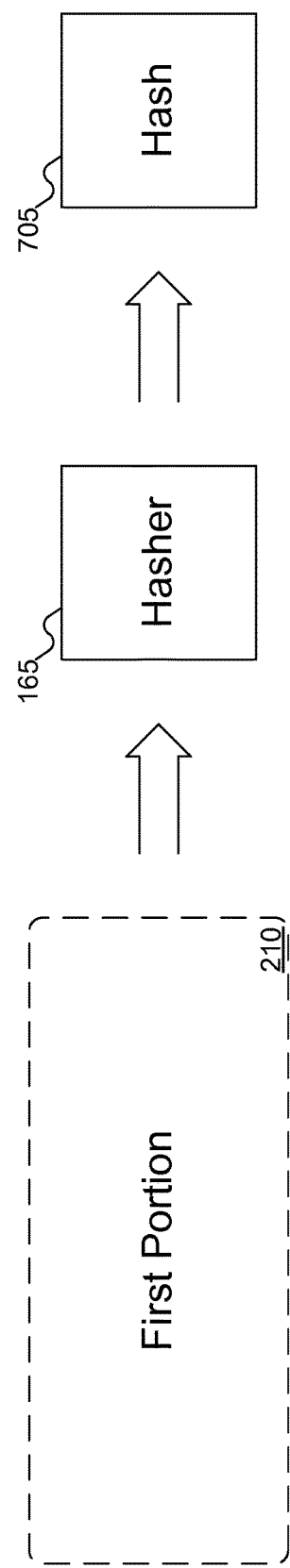
FIG. 7 shows a portion of the file of FIG. 2 being hashed for use with the file content policy of FIG. 1.

While the above description suggests that whitelist 605 can store the specific content to be allowed, other embodiments of the invention can identify the content that is whitelisted in other ways. For example, whitelist 605 can include a hash of the allowable content. To that end, FIG. 7 shows portion 210 of file 110 of FIG. 2 being hashed for use with the file content policy of FIG. 1. In FIG. 7, portion 210 is processed by hasher 165 to generate hash 705. Hash 705 can then be compared (using comparator 160) with hashes stored in whitelist 605 to determine whether the content should be allowed, sanitised, or quarantined.

FIG. 8 shows details of file issue exclusion policy 125 of FIG. 1. In FIG. 8, file issue exclusion policy 125 is shown as including approved list 805 and blocked list 810. Approved list 805 lists specific issues for specific file types that, if detected, are considered safe. Using approved list 805 can enable a customer to let a file through that might otherwise be blocked for failing to conform to set of rules 135. In FIG. 8, approved list 805 is shown as including pdf file type 815 and issue ID B070645 (ID 815) as an approved combination. In contrast, blocked list 810 includes various file types and issue IDs, such as doc file type 820 and issue ID 1 (ID 825).

Recall that a problem with the system as described is that the system assumes that legitimate files will conform to the rules associated with the file type. While this assumption is reasonable on its face, it can happen that legitimate content might not conform to the rules. For example, pdf files can be generated using any number of different tools. If any of these tools is mis-programmed, the resulting file might not conform to set of rules 135, even though the content is not malicious.

While the optimal solution to this problem would be to fix the tool that is mis-programmed, this option is not always available. First, the tool that includes the bug might be developed by a third party who is unwilling to fix the bug. Second, fixing the bug in the tool might be considered to cost more than the effort is worth. For example, if the bug is only identified as a problem when using the described system, fixing the bug might not be worth the cost.

But using approved list 805 provides a way to let a non-conformal file through the system, despite its non-conformity with set of rules 135. The customer can specify the particular type of the affected file (e.g., pdf file type) and the particular issue ID raised by files generated using that tool (e.g., issue ID B070645) in approved list 805. Then, even though some files do not conform to set of rules 135, these files can be delivered to the intended recipient.

A few additional comments about file issue exclusion policy 125 are in order. First, in some embodiments of the invention, file issue exclusion policy 125 is used only with files that are quarantined. That is, if the system only flags a portion of content 205 of file 110 as not conforming to set of rules 135, then that portion of content 205 can be sanitised from the file and the rest of the file allowed through. But in other embodiments of the invention, file issue exclusion policy 125 can be applied to individual portions of content 205, indicating content that can be permitted to be included in the file as delivered to the intended recipient.

Second, the purpose of blocked list 810 might be unclear. After all, if file 110 (or a portion of its content 205) has already been subject to quarantine or sanitisation, what is the purpose of "blocking" such content? The answer is that blocked list 810 can provide the customer with information about conformity issues that should not be bypassed. For example, issue ID 1 (ID 825) is included in blocked list 810 for a number of different file types. This issue ID might represent a significant problem with the file, and that the file should not be delivered to the intended recipient. By including this issue ID in blocked list 810, the customer can be made aware of particular issues that should not be included in approved list 805. Thus, blocked list 810 is not necessarily used by the system, but it informs the customer about changes that should be avoided.

Third, FIG. 8 shows only one issue ID (ID 830) in approved list 805. But there is no reason why approved list 805 cannot have more than one issue that is approved. If the approved issue IDs are for different file types, each issue ID effectively operates independently. But if approved list 805 has multiple approved issue IDs for a given file type, there are several possibilities how to handle the multiple issue IDs.

One possibility is that if file 110 has multiple reasons why it is non-conforming to set of rules 135, every reason why file 110 is non-conforming must be on approved list 805 to permit file 110 to be delivered. A second possibility is that if file 110 has multiple reasons why it is non-conforming to set of rules 135, at least one of those reasons must be on approved list 805. A third possibility is that if file 110 has multiple reasons why it is non-conforming to set of rules 135, at least one of those reasons must be on approved list 805, and none of the reasons can be on blocked list 810. A person skilled in the art will recognise other variations in how to handle file 13 when it fails to conform to set of rule 135 for multiple reasons.

Figure 9A:
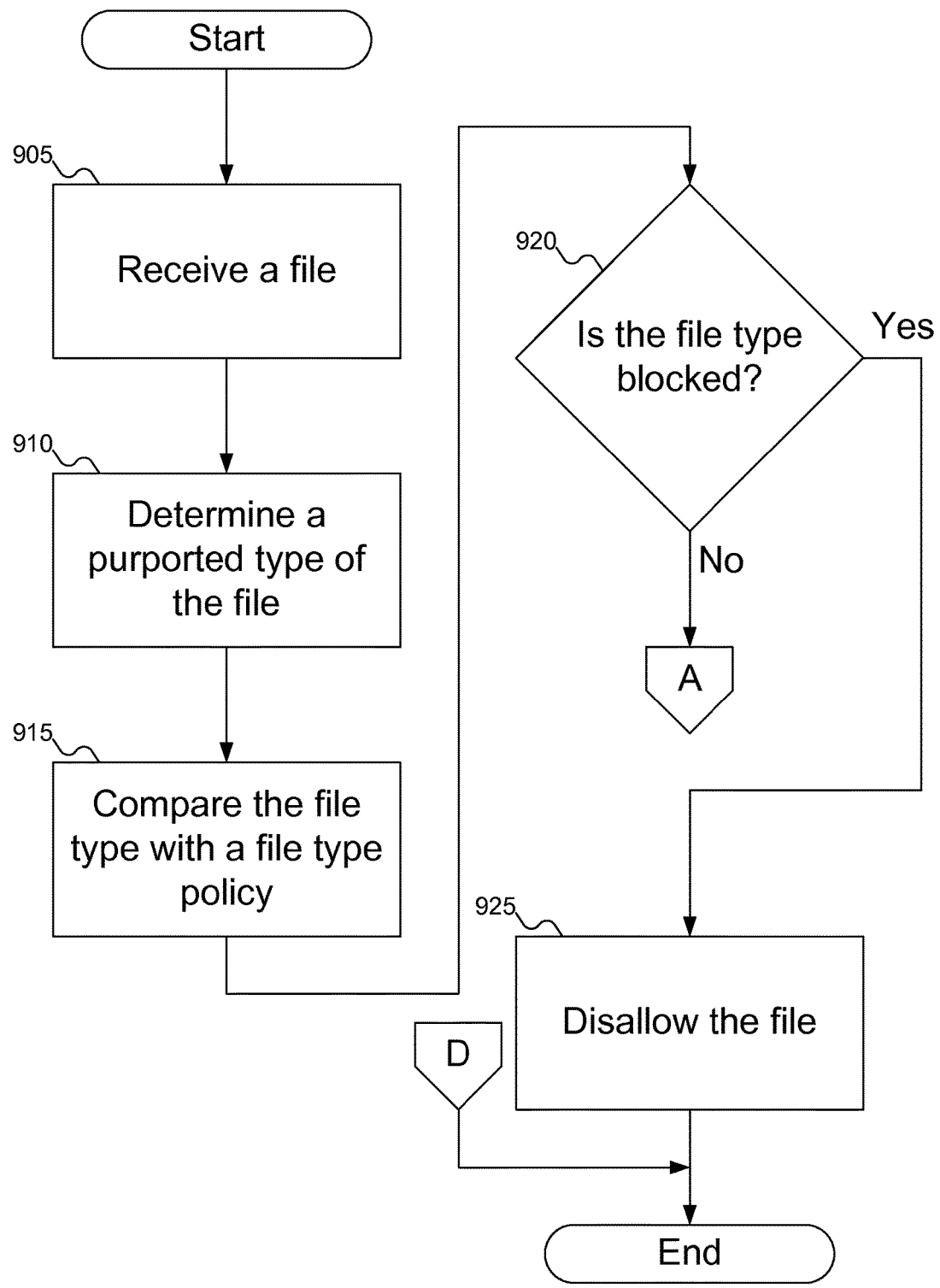
FIGS. 9A-9C show a flowchart of a procedure for using policies, such as the file issue exclusion policy of FIG. 1, in determining whether a file is considered a risk, according to an embodiment of the invention.
Figure 9B:
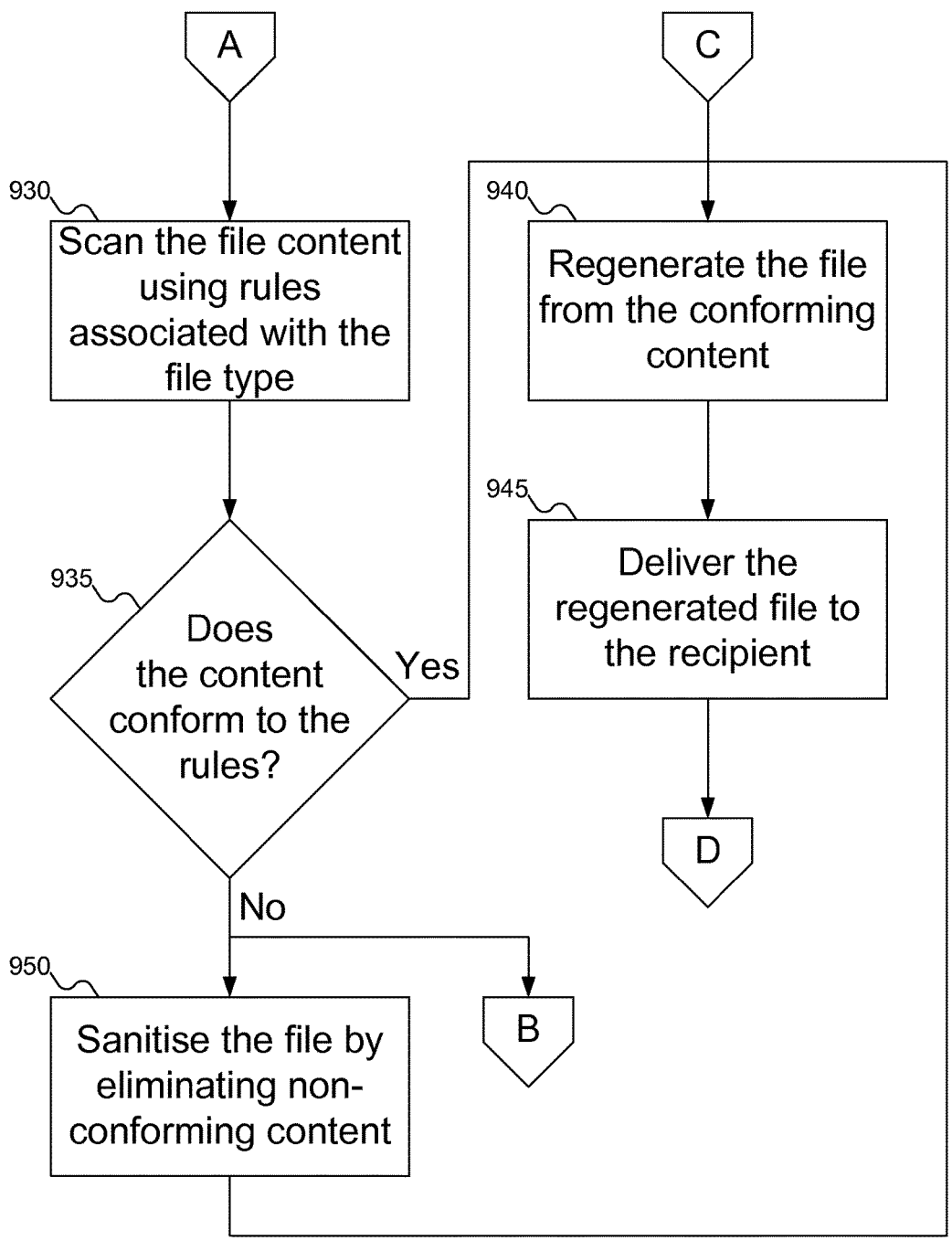
Figure 9C:
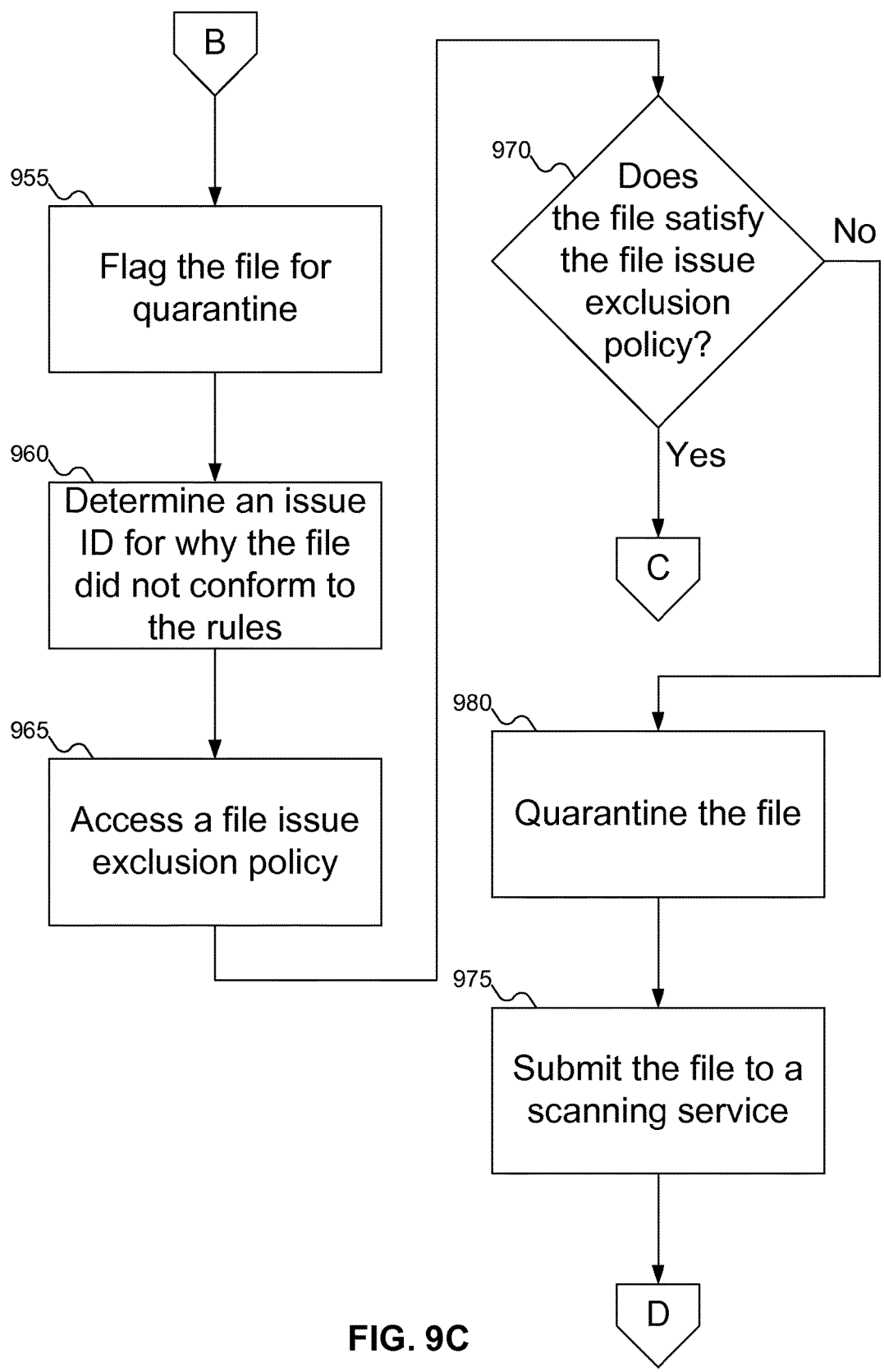

FIGS. 9A-9C show a flowchart of a procedure for using policies, such as file issue exclusion policy 125 of FIG. 1, in determining whether file 110 is considered a risk, according to an embodiment of the invention. In FIG. 9A, at block 905, computer system 105 can receive file 110. At block 910, computer system 105 can determine a purported file type of file 110. At block 915, computer system 105 can compare the purported file type of file 110 with file type policy 115. At block 920, computer system 105 can determine whether the purported file type of file 110 is blocked by file type policy 115. If so, then at block 925, file 110 is disallowed.

Otherwise, if the purported file type of file 110 is not blocked by file type policy 115, then at block 930 (FIG. 9B), computer system 105 can scan file 110 using set of rules 135, to determine if file 110 conforms to the rules for the purported file type of file 110. At block 935, computer system 105 can determine if file 110 conforms to set of rules 135. If so, then at block 940, computer system 105 can regenerate file 110 from the conforming content, and at block 945, computer system 105 can deliver the regenerated file to the intended recipient, after which computer system 105 has finished processing file 110. If computer system 105 can determine that file 110 does not conform to set of rules 135, then at block 950, computer system 105 can sanitise file 110 to eliminate the non-conforming content before processing to blocks 945-950 to regenerate the file and deliver the regenerated file to the intended recipient.

But block 950 is performed only if the file can be sanitised. If computer system 105 can determine that file 110 should be quarantined, then processing proceeds to block 955 (FIG. 9C), where the file is flagged for quarantine. At block 960, computer system 105 can determine the ID(s) of the issue(s) that prevented file 110 from conforming to set of rules 135. At block 965, computer system 105 accesses file issue exclusion policy 125. At block 970, computer system 105 can determine if file 110 satisfies file issue exclusion policy 125. If so, then processing returns to blocks 940-930 (FIG. 9B) to regenerate the file and deliver the regenerated file to the intended recipient. Otherwise, at block 975, computer system 105 can submit file 110 to a scanning service for further analysis, after which processing is complete.

In FIGS. 9A-9B (and in the other flowcharts below), one embodiment of the invention is shown. But a person skilled in the art will recognise that other embodiments of the invention are also possible, by changing the order of the blocks, by omitting blocks, or by including links between blocks not shown in the drawings. All such variations of the flowcharts are considered to be embodiments of the invention, whether expressly described or not.

Figure 10A:
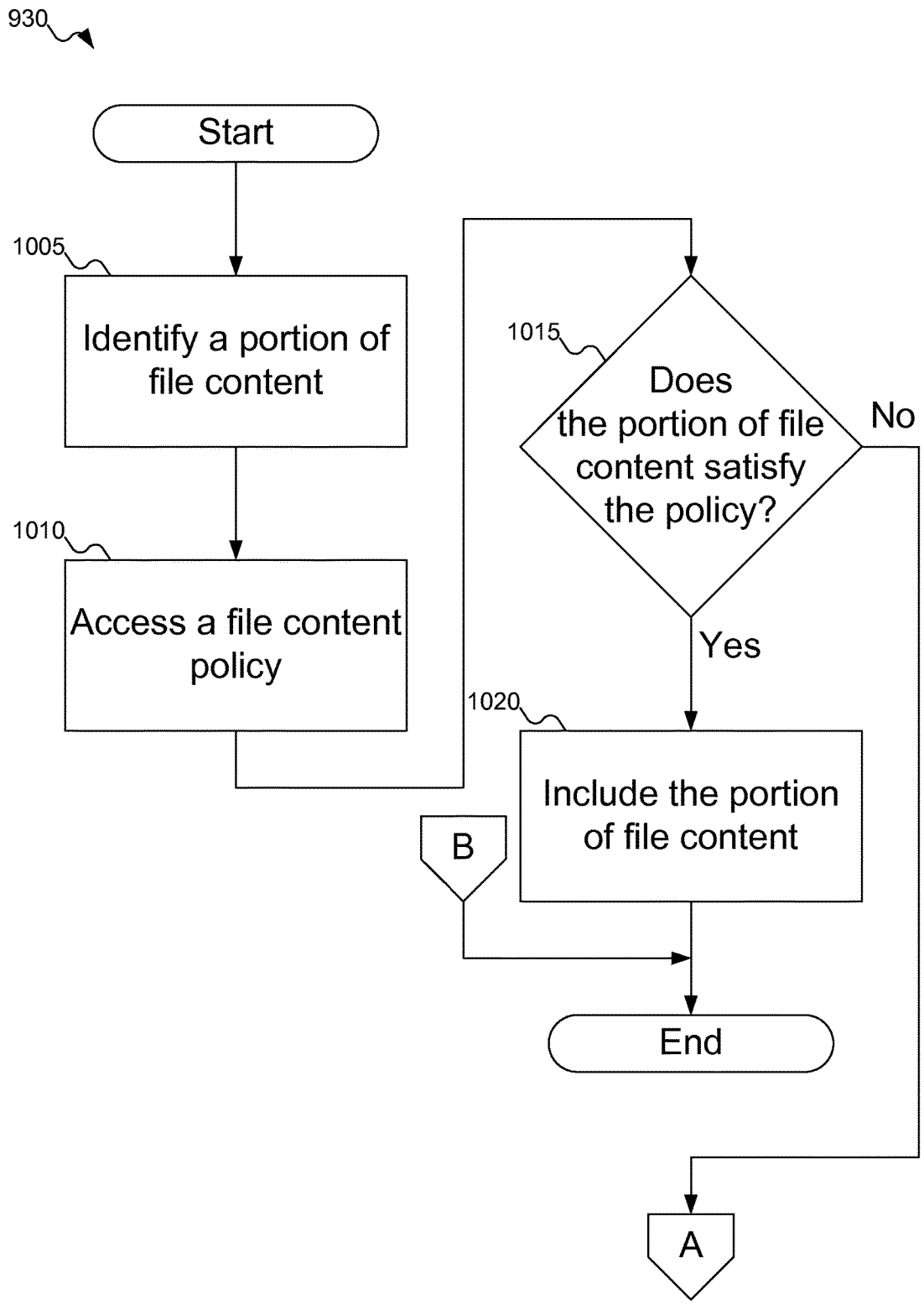
FIGS. 10A-10B show a flowchart of a procedure for using a file content policy in determining how to process a file for which a portion of the content does not conform to a set of rules, according to an embodiment of the invention.
Figure 10B:
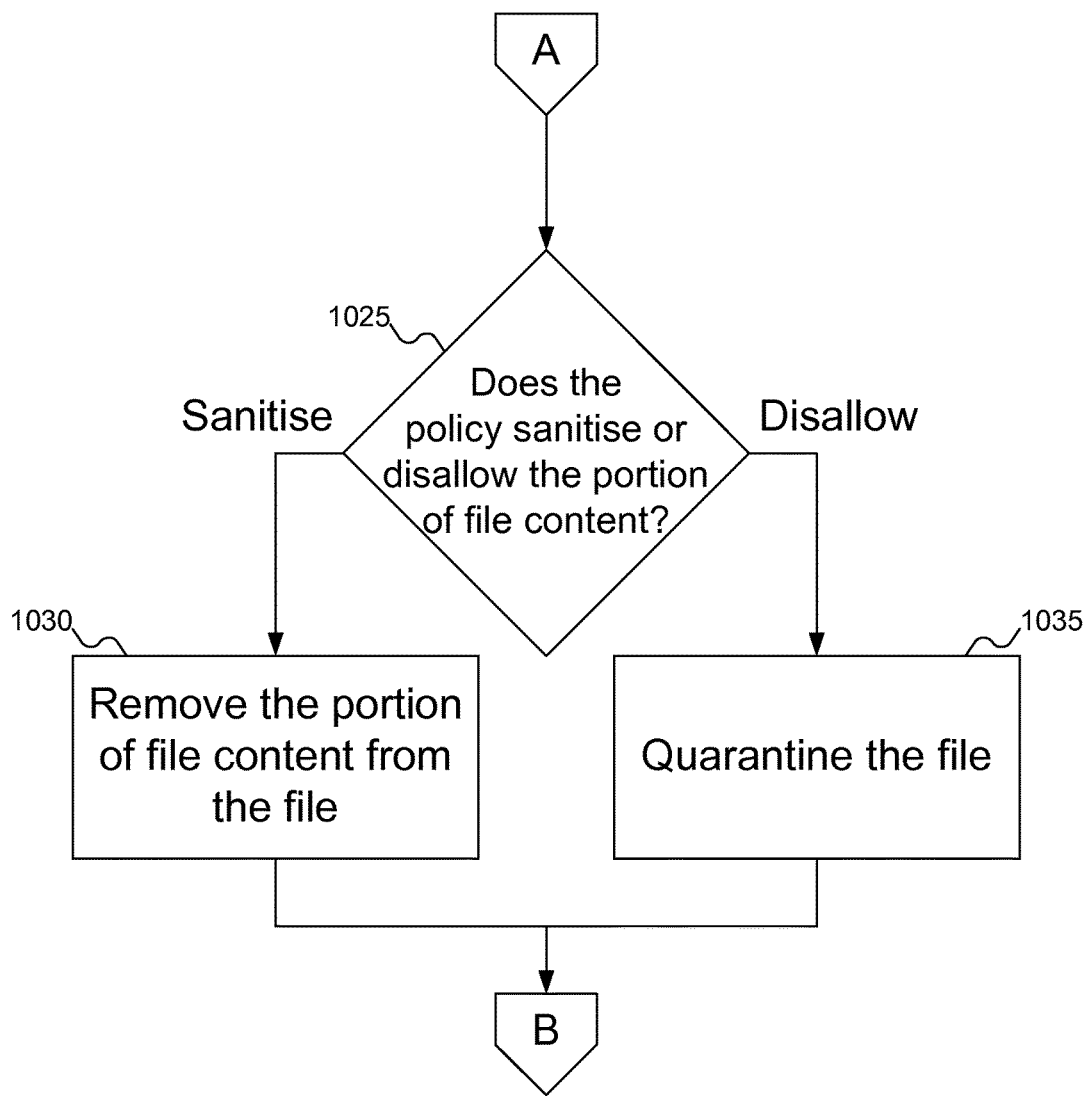

FIGS. 10A-10B show a flowchart of a procedure for using file content policy 120 in determining how to process file 110 for which a portion of content 205 does not conform to set of rules 135, according to an embodiment of the invention. In FIG. 10A, at block 1005, computer system 105 can identify a portion of content 205 of file 110. At block 1010, computer system 105 can access file content policy 120. At block 1015, computer system 105 can determine if the portion of content 205 of file 110 satisfies file content policy 120: that is, is the portion of content 205 of file 110 included in whitelist 605 (as either directly, as a hash, or in some other form). If so, then at block 1020 the portion of content 205 can be included in the file when file 110 is regenerated, after which processing is complete.

If computer system 105 can determine that the portion of content 205 of file 110 does not satisfy file content policy 120, then at block 1025 (FIG. 10B), computer system 105 can determine if file content policy 120 specifies that the portion of content 205 of file 110 should be sanitised or file 110 should be quarantined. If file content policy 120 indicates sanitisation, then at block 1030, the portion of content 205 of file 110 is removed before file 110 is regenerated. Otherwise, at block 1035, file 110 is quarantined.

Figure 11:
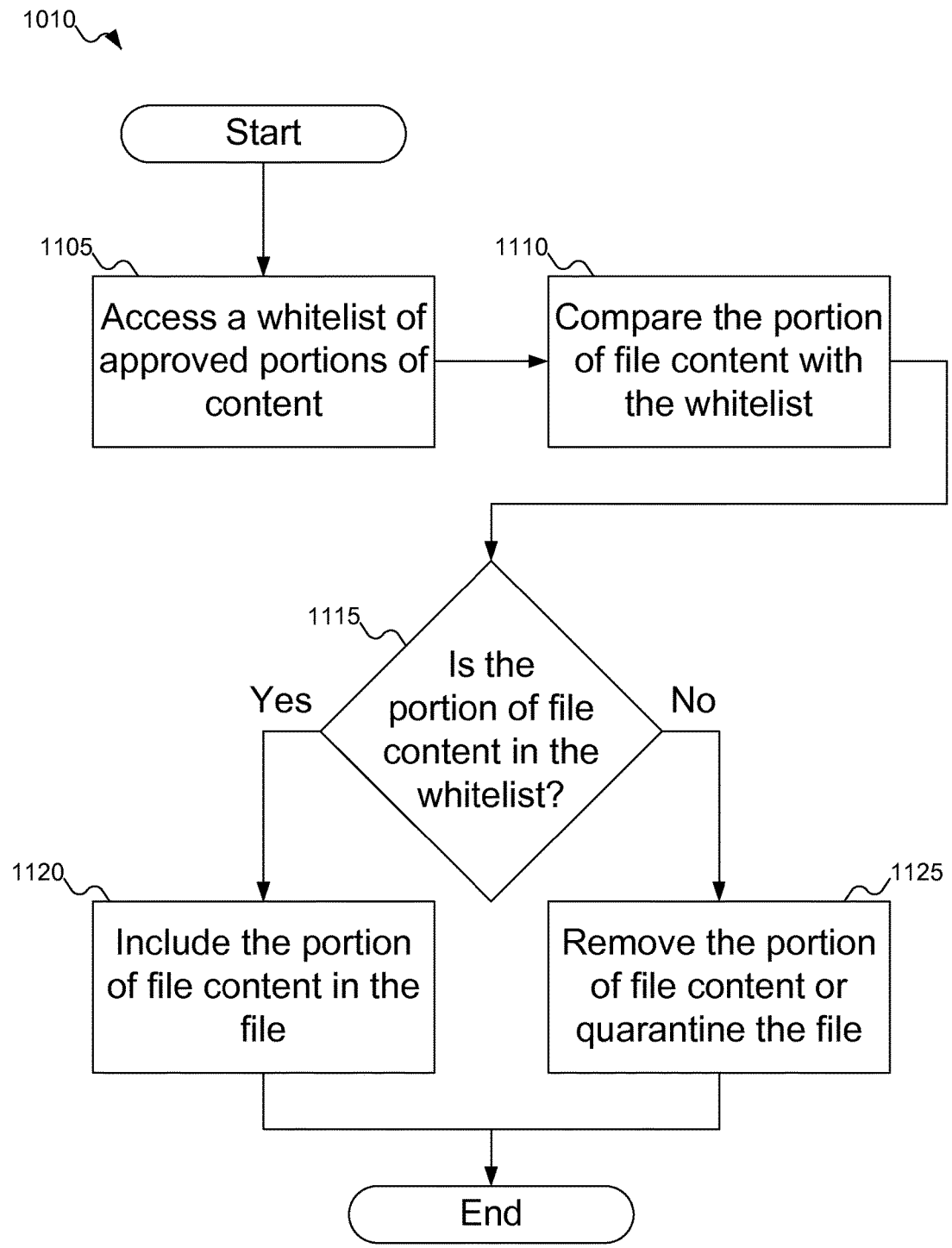
FIG. 11 shows a flowchart of a procedure for using a file content policy to determine whether a portion of content of a file is considered safe even though the portion does not conform to a set of rules, according to an embodiment of the invention.

FIG. 11 shows a flowchart of a procedure for using 120 file content policy to determine whether a portion of content 205 of file 110 is considered safe even though the portion does not conform to set of rules 135, according to an embodiment of the invention. At block 1105, computer system 105 can access whitelist 605 of approved portions of content. At block 1110, computer system 105 can compare the portion of content 205 of file 110 with whitelist 605. At block 1115, computer system 105 can determine if the portion of content 205 of file 110 is in whitelist 605. If so, then at block 1120, computer system 105 can include the portion of content 205 in file 110. Otherwise, at block 1125, computer system 105 can remove the portion of content 205, or quarantine file 110, as appropriate.

Figure 12A:
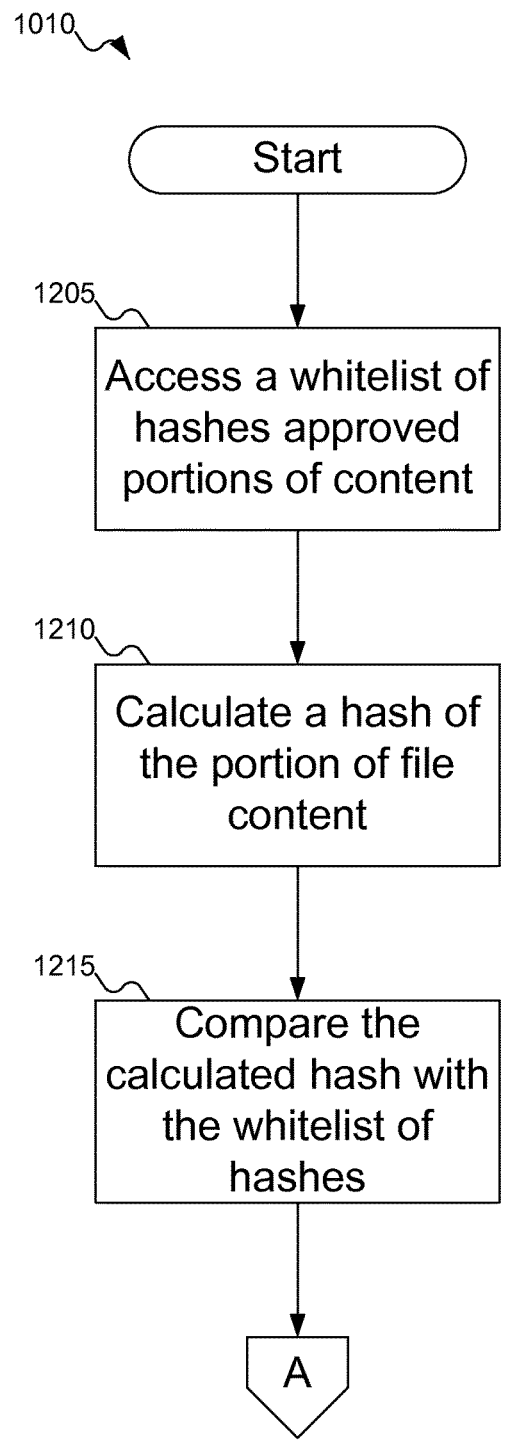
FIGS. 12A-12B show a flowchart of a procedure for using a file content policy in determining how to process a file for which a portion of the content does not conform to a set of rules, according to another embodiment of the invention.
Figure 12B:
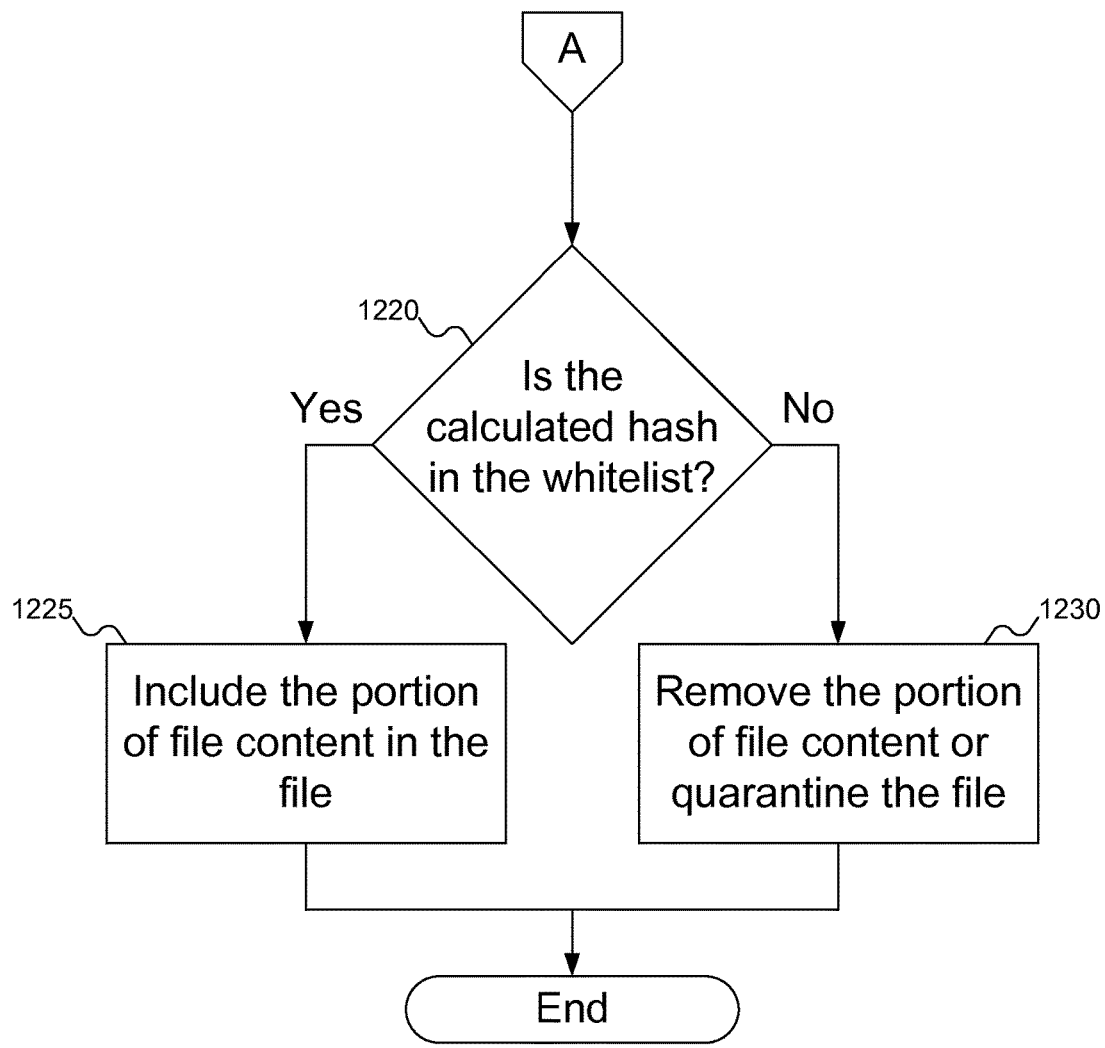

FIGS. 12A-12B show a flowchart of a procedure for using file content policy 120 in determining how to process file 110 for which a portion of content 205 does not conform to set of rules 135, according to another embodiment of the invention. In FIG. 12A, at block 1205, computer system 105 can access whitelist 605 of hashes of approved portions of content. At block 1210, computer system 105 can calculate a hash of the portion of content 210 of file 110. At block 1215, computer system 105 can compare the calculated hash with whitelist 605.

At block 1220 (FIG. 12B), computer system 105 can determine if the calculated hash is in whitelist 605. If so, then at block 1225, computer system 105 can include the portion of content 205 in file 110. Otherwise, at block 1230, computer system 105 can remove the portion of content 205, or quarantine the file, as appropriate.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilise one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilise various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Embodiments of the inventive concept can include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognised that the illustrated embodiments can be modified in arrangement and detail without departing from such principles, and can be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the invention can extend to the following statements, without limitation:

An embodiment of the invention includes a system, comprising: a receiver to receive a file at a computer system, the file including a content; a file type identifier to identify a purported file type of the file; a scanner to scan the content of the file using a set of rules corresponding to the purported file type, the scanner operative to determine that the file does not conform to the set of rules corresponding to the purported file type for a first reason with an associated first issue ID; a quarantine that can store the file; a file issue exclusion policy specifying an approved file type and a second issue ID; and a transmitter to transmit the file to the recipient instead of storing the file in the quarantine if the approved file type in the file issue exclusion policy matches the purported file type and the second issue ID in the file issue exclusion policy matches the first issue ID.

An embodiment of the invention includes a system, comprising: a receiver to receive a file at a computer system, the file including a content; a file type identifier to identify a purported file type of the file; a file type policy that can be used to block the file if the purported file type of the file matches a file type in the file type policy; a scanner to scan the content of the file using a set of rules corresponding to the purported file type, the scanner operative to determine that the file does not conform to the set of rules corresponding to the purported file type for a first reason with an associated first issue ID; a quarantine that can store the file; a file issue exclusion policy specifying an approved file type and a second issue ID; and a transmitter to transmit the file to the recipient instead of storing the file in the quarantine if the approved file type in the file issue exclusion policy matches the purported file type and the second issue ID in the file issue exclusion policy matches the first issue ID.

An embodiment of the invention includes a system, comprising: a receiver to receive a file at a computer system, the file including a content, the content of the file including a first portion; a file type identifier to identify a purported file type of the file; a file content policy that can be used to: allow the first portion of the content of the file to be included in the file, quarantine the file, or sanitise the first portion of the content of the file; a scanner to scan the content of the file using a set of rules corresponding to the purported file type, the scanner operative to determine that the file does not conform to the set of rules corresponding to the purported file type for a first reason with an associated first issue ID; a quarantine that can store the file; a file issue exclusion policy specifying an approved file type and a second issue ID; and a transmitter to transmit the file to the recipient instead of storing the file in the quarantine if the approved file type in the file issue exclusion policy matches the purported file type and the second issue ID in the file issue exclusion policy matches the first issue ID.

An embodiment of the invention includes a system, comprising: a receiver to receive a file at a computer system, the file including a content, the content of the file including a first portion; a file type identifier to identify a purported file type of the file; a file content policy including a whitelist of known approved portions of content that can be used to: allow the first portion of the content of the file to be included in the file, quarantine the file, or sanitise the first portion of the content of the file, wherein the first portion of the content of the file can be included in the file if the first portion of the content of the file matches a known approved portion of content in the whitelist; a comparator to compare the first portion of the content of the file with the whitelist; a scanner to scan the content of the file using a set of rules corresponding to the purported file type, the scanner operative to determine that the file does not conform to the set of rules corresponding to the purported file type for a first reason with an associated first issue ID; a quarantine that can store the file; a file issue exclusion policy specifying an approved file type and a second issue ID; and a transmitter to transmit the file to the recipient instead of storing the file in the quarantine if the approved file type in the file issue exclusion policy matches the purported file type and the second issue ID in the file issue exclusion policy matches the first issue ID.

An embodiment of the invention includes a system, comprising: a receiver to receive a file at a computer system, the file including a content, the content of the file including a first portion; a file type identifier to identify a purported file type of the file; a file content policy including a whitelist of known approved portions of content that can be used to: allow the first portion of the content of the file to be included in the file, quarantine the file, or sanitise the first portion of the content of the file, wherein the first portion of the content of the file can be included in the file if the first portion of the content of the file matches a known approved portion of content in the whitelist; a comparator to compare the first portion of the content of the file with the whitelist; a sanitiser to sanitise the first portion of the content of the file if the first portion of the content of the file does not match a known approved portion of content in the whitelist; a scanner to scan the content of the file using a set of rules corresponding to the purported file type, the scanner operative to determine that the file does not conform to the set of rules corresponding to the purported file type for a first reason with an associated first issue ID; a quarantine that can store the file; a file issue exclusion policy specifying an approved file type and a second issue ID; and a transmitter to transmit the file to the recipient instead of storing the file in the quarantine if the approved file type in the file issue exclusion policy matches the purported file type and the second issue ID in the file issue exclusion policy matches the first issue ID.

An embodiment of the invention includes a system, comprising: a receiver to receive a file at a computer system, the file including a content, the content of the file including a first portion; a file type identifier to identify a purported file type of the file; a hasher to generate a hash of the first portion of the content of the file; a file content policy including a whitelist of hashes of known approved portions of content that can be used to: allow the first portion of the content of the file to be included in the file, quarantine the file, or sanitise the first portion of the content of the file, wherein the first portion of the content of the file can be included in the file if the generated hash of the first portion of the content of the file matches a hash of a known approved portion of content in the whitelist; a comparator to compare the generated hash of the first portion of the content of the file with the whitelist; a scanner to scan the content of the file using a set of rules corresponding to the purported file type, the scanner operative to determine that the file does not conform to the set of rules corresponding to the purported file type for a first reason with an associated first issue ID; a quarantine that can store the file; a file issue exclusion policy specifying an approved file type and a second issue ID; and a transmitter to transmit the file to the recipient instead of storing the file in the quarantine if the approved file type in the file issue exclusion policy matches the purported file type and the second issue ID in the file issue exclusion policy matches the first issue ID.

An embodiment of the invention includes a system, comprising: a receiver to receive a file at a computer system, the file including a content; a file type identifier to identify a purported file type of the file; a scanner to scan the content of the file using a set of rules corresponding to the purported file type, the scanner operative to determine that the file does not conform to the set of rules corresponding to the purported file type for a first reason with an associated first issue ID; a quarantine that can store the file; a file issue exclusion policy specifying an approved file type and a second issue ID; and a transmitter to transmit the file to the recipient instead of storing the file in the quarantine if the approved file type in the file issue exclusion policy matches the purported file type and the second issue ID in the file issue exclusion policy matches the first issue ID, wherein the system is operative to quarantine the file if the first issue ID does not match the second issue ID.

An embodiment of the invention includes a system, comprising: a receiver to receive a file at a computer system, the file including a content; a file type identifier to identify a purported file type of the file; a scanner to scan the content of the file using a set of rules corresponding to the purported file type, the scanner operative to determine that the file does not conform to the set of rules corresponding to the purported file type for a first reason with an associated first issue ID; a quarantine that can store the file; a file issue exclusion policy specifying an approved file type and a second issue ID; and a transmitter to transmit the file to the recipient instead of storing the file in the quarantine if the approved file type in the file issue exclusion policy matches the purported file type and the second issue ID in the file issue exclusion policy matches the first issue ID, wherein the file issue exclusion policy can specify a blocked file type and a third issue ID.

An embodiment of the invention includes a system, comprising: a receiver to receive a file at a computer system, the file including a content; a file type identifier to identify a purported file type of the file; a scanner to scan the content of the file using a set of rules corresponding to the purported file type, the scanner operative to determine that the file does not conform to the set of rules corresponding to the purported file type for a first reason with an associated first issue ID; a quarantine that can store the file; a file issue exclusion policy specifying an approved file type and a second issue ID; and a transmitter to transmit the file to the recipient instead of storing the file in the quarantine if the approved file type in the file issue exclusion policy matches the purported file type and the second issue ID in the file issue exclusion policy matches the first issue ID, wherein the file issue exclusion policy can be set by the recipient.

An embodiment of the invention includes a system, comprising: a receiver to receive a file at a computer system, the file including a content; a file type identifier to identify a purported file type of the file; a scanner to scan the content of the file using a set of rules corresponding to the purported file type, the scanner operative to determine that the file does not conform to the set of rules corresponding to the purported file type for a first reason with an associated first issue ID; a quarantine that can store the file; a file issue exclusion policy specifying an approved file type and a second issue ID; and a transmitter to transmit the file to the recipient instead of storing the file in the quarantine if the approved file type in the file issue exclusion policy matches the purported file type and the second issue ID in the file issue exclusion policy matches the first issue ID, wherein the file issue exclusion policy can be set to apply to a plurality of recipients by corporate policy.

An embodiment of the invention includes a method, comprising: receiving a file at a computer system, the file include content; determining a purported file type of the file; scanning the content of the file using a set of rules corresponding to the purported file type; determining that content does not conform to the set of rules corresponding to the purported file type; flagging the file for quarantine; determining a first issue ID for an issue as to why the content does not conform to the set of rules. accessing a file issue exclusion policy, the file issue exclusion policy specifying an approved file type and a second issue ID; and transmitting the file to a recipient instead of quarantining the file if approved file type in the file issue exclusion policy matches the purported file type and the second issue ID in the file issue exclusion policy matches the first issue ID.

An embodiment of the invention includes a method, comprising: receiving a file at a computer system, the file include content; determining a purported file type of the file; scanning the content of the file using a set of rules corresponding to the purported file type; determining that content does not conform to the set of rules corresponding to the purported file type; flagging the file for quarantine; determining a first issue ID for an issue as to why the content does not conform to the set of rules. accessing a file issue exclusion policy, the file issue exclusion policy specifying an approved file type and a second issue ID; transmitting the file to a recipient instead of quarantining the file if approved file type in the file issue exclusion policy matches the purported file type and the second issue ID in the file issue exclusion policy matches the first issue ID; and quarantining the file if the first issue ID does not match the second issue ID.

An embodiment of the invention includes a method, comprising: receiving a file at a computer system, the file include content; determining a purported file type of the file; scanning the content of the file using a set of rules corresponding to the purported file type; determining that content does not conform to the set of rules corresponding to the purported file type; flagging the file for quarantine; determining a first issue ID for an issue as to why the content does not conform to the set of rules. accessing a file issue exclusion policy, the file issue exclusion policy specifying an approved file type and a second issue ID; and transmitting the file to a recipient instead of quarantining the file if approved file type in the file issue exclusion policy matches the purported file type and the second issue ID in the file issue exclusion policy matches the first issue ID, wherein the file issue exclusion policy can specify a blocked file type and a third issue ID.

An embodiment of the invention includes a method, comprising: receiving a file at a computer system, the file include content; determining a purported file type of the file; scanning the content of the file using a set of rules corresponding to the purported file type; determining that content does not conform to the set of rules corresponding to the purported file type; flagging the file for quarantine; determining a first issue ID for an issue as to why the content does not conform to the set of rules. accessing a file issue exclusion policy, the file issue exclusion policy specifying an approved file type and a second issue ID; and transmitting the file to a recipient instead of quarantining the file if approved file type in the file issue exclusion policy matches the purported file type and the second issue ID in the file issue exclusion policy matches the first issue ID, wherein the file issue exclusion policy can be set by the recipient.

An embodiment of the invention includes a method, comprising: receiving a file at a computer system, the file include content; determining a purported file type of the file; scanning the content of the file using a set of rules corresponding to the purported file type; determining that content does not conform to the set of rules corresponding to the purported file type; flagging the file for quarantine; determining a first issue ID for an issue as to why the content does not conform to the set of rules. accessing a file issue exclusion policy, the file issue exclusion policy specifying an approved file type and a second issue ID; and transmitting the file to a recipient instead of quarantining the file if approved file type in the file issue exclusion policy matches the purported file type and the second issue ID in the file issue exclusion policy matches the first issue ID, wherein the file issue exclusion policy can be set to apply to a plurality of recipients by corporate policy.

An embodiment of the invention includes a method, comprising: receiving a file at a computer system, the file include content; determining a purported file type of the file; comparing the purported file type with a file type policy; if the file type policy specifies that the purported file type is blocked, disallowing the file; if the file type policy specifies that the purported file type is allowed, allowing the file to proceed to scanning; scanning the content of the file using a set of rules corresponding to the purported file type; determining that content does not conform to the set of rules corresponding to the purported file type; flagging the file for quarantine; determining a first issue ID for an issue as to why the content does not conform to the set of rules. accessing a file issue exclusion policy, the file issue exclusion policy specifying an approved file type and a second issue ID; and transmitting the file to a recipient instead of quarantining the file if approved file type in the file issue exclusion policy matches the purported file type and the second issue ID in the file issue exclusion policy matches the first issue ID.

An embodiment of the invention includes a method, comprising: receiving a file at a computer system, the file include content; determining a purported file type of the file; scanning the content of the file using a set of rules corresponding to the purported file type, including identifying a first portion of the content of the file that can include malicious content, accessing a file content policy, if the file content policy specifies that the first portion of the content of the file is allowed, allowing the first portion of the content of the file to be included in the file, if the file content policy specifies that the first portion of the content of the file is disallowed, quarantining the file, and if the file content policy specifies that the first portion of the content of the file is to be sanitised, sanitising the first portion of the content of the file; determining that content does not conform to the set of rules corresponding to the purported file type; flagging the file for quarantine; determining a first issue ID for an issue as to why the content does not conform to the set of rules. accessing a file issue exclusion policy, the file issue exclusion policy specifying an approved file type and a second issue ID; and transmitting the file to a recipient instead of quarantining the file if approved file type in the file issue exclusion policy matches the purported file type and the second issue ID in the file issue exclusion policy matches the first issue ID.

An embodiment of the invention includes a method, comprising: receiving a file at a computer system, the file include content; determining a purported file type of the file; scanning the content of the file using a set of rules corresponding to the purported file type, including identifying a first portion of the content of the file that can include malicious content, accessing a file content policy including a whitelist of known approved portions of content, comparing the first portion of the content of the file with the whitelist of known approved portions of content, if the first portion of the content of the file is included in the whitelist, including the first portion of the content of the file in the file, if the file content policy specifies that the first portion of the content of the file is disallowed, quarantining the file, and if the file content policy specifies that the first portion of the content of the file is to be sanitised, sanitising the first portion of the content of the file; determining that content does not conform to the set of rules corresponding to the purported file type; flagging the file for quarantine; determining a first issue ID for an issue as to why the content does not conform to the set of rules. accessing a file issue exclusion policy, the file issue exclusion policy specifying an approved file type and a second issue ID; and transmitting the file to a recipient instead of quarantining the file if approved file type in the file issue exclusion policy matches the purported file type and the second issue ID in the file issue exclusion policy matches the first issue ID.

An embodiment of the invention includes a method, comprising: receiving a file at a computer system, the file include content; determining a purported file type of the file; scanning the content of the file using a set of rules corresponding to the purported file type, including identifying a first portion of the content of the file that can include malicious content, accessing a file content policy including a whitelist of known approved portions of content, comparing the first portion of the content of the file with the whitelist of known approved portions of content, if the first portion of the content of the file is included in the whitelist, including the first portion of the content of the file in the file, if the first portion of the content of the file is not included in the whitelist, removing the first portion of the content of the file from the file, if the file content policy specifies that the first portion of the content of the file is disallowed, quarantining the file, and if the file content policy specifies that the first portion of the content of the file is to be sanitised, sanitising the first portion of the content of the file; determining that content does not conform to the set of rules corresponding to the purported file type; flagging the file for quarantine; determining a first issue ID for an issue as to why the content does not conform to the set of rules. accessing a file issue exclusion policy, the file issue exclusion policy specifying an approved file type and a second issue ID; and transmitting the file to a recipient instead of quarantining the file if approved file type in the file issue exclusion policy matches the purported file type and the second issue ID in the file issue exclusion policy matches the first issue ID.

An embodiment of the invention includes a method, comprising: receiving a file at a computer system, the file include content; determining a purported file type of the file; scanning the content of the file using a set of rules corresponding to the purported file type, including identifying a first portion of the content of the file that can include malicious content, accessing a file content policy including a whitelist of hashes of known approved portions of content, calculating a hash of the first portion of the content of the file, comparing the hash of the first portion of the content of the file with the whitelist of hashes of known approved portions of content, if the first portion of the content of the file is included in the whitelist, including the first portion of the content of the file in the file, if the file content policy specifies that the first portion of the content of the file is disallowed, quarantining the file, and if the file content policy specifies that the first portion of the content of the file is to be sanitised, sanitising the first portion of the content of the file; determining that content does not conform to the set of rules corresponding to the purported file type; flagging the file for quarantine; determining a first issue ID for an issue as to why the content does not conform to the set of rules. accessing a file issue exclusion policy, the file issue exclusion policy specifying an approved file type and a second issue ID; and transmitting the file to a recipient instead of quarantining the file if approved file type in the file issue exclusion policy matches the purported file type and the second issue ID in the file issue exclusion policy matches the first issue ID.

An embodiment of the invention includes a method, comprising: receiving a file at a computer system, the file include content; determining a purported file type of the file; scanning the content of the file using a set of rules corresponding to the purported file type; determining that content does not conform to the set of rules corresponding to the purported file type; flagging the file for quarantine; determining a first issue ID for an issue as to why the content does not conform to the set of rules. accessing a file issue exclusion policy, the file issue exclusion policy specifying an approved file type and a second issue ID; transmitting the file to a recipient instead of quarantining the file if approved file type in the file issue exclusion policy matches the purported file type and the second issue ID in the file issue exclusion policy matches the first issue ID; and if the file is subject to quarantine, submitting the file to a scanning service for additional analysis to determine whether the file can be released from quarantine.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A system, comprising:
   a receiver to receive a file at a computer system, the file including a content, the content including a first portion;
   a file type identifier to identify a purported file type of the file;
   a scanner to scan the content of the file using a set of rules corresponding to the purported file type, the scanner operative to determine that the file does not conform to the set of rules corresponding to the purported file type for a first reason with an associated first issue identifier (ID);
   a quarantine that can store the file;
   a file issue exclusion policy specifying an approved file type and a second issue ID;
   a file content policy to allow the first portion of the content of the file to be included in the file, the file content policy including a whitelist of hashes of known approved portions of content;
   a hasher to generate a hash of the first portion of the content of the file;
   a comparator to compare the first portion of the content of the file with the whitelist;
   a scanning service to perform additional analysis to determine whether the file can be released from quarantine; and
   a transmitter to transmit the file to the recipient instead of storing the file in the quarantine when the approved file type in the file issue exclusion policy matches the purported file type and the second issue ID in the file issue exclusion policy matches the first issue ID,
   wherein the first portion of the content of the file is included in the file when the first portion of the content of the file matches a known approved portion of content in the whitelist.

2. The system according to claim 1, further comprising a file type policy to block the file when the purported file type of the file matches a file type in the file type policy.

3. The system according to claim 1, wherein the file content policy indicates to:
   quarantine the file, or
   sanitize the first portion of the content of the file.

4. The system according to claim 1, wherein the system includes a sanitizer to sanitize the first portion of the content of the file when the first portion of the content of the file does not matches a known approved portion of content in the whitelist.

5. The system according to claim 1, wherein the system is operative to quarantine the file when the first issue ID does not match the second issue ID.

6. The system according to claim 1, wherein the file issue exclusion policy can specify a blocked file type and a third issue ID.

7. The system according to claim 1, wherein the file issue exclusion policy is set by the recipient.

8. The system according to claim 1, wherein the file issue exclusion policy applies to a plurality of recipients by corporate policy.

9. A method, comprising:
   receiving a file at a computer system, the file include content;
   determining a purported file type of the file;
   scanning the content of the file using a set of rules corresponding to the purported file type, including:
   identifying a first portion of the content of the file that can include malicious content;
   accessing a whitelist of hashes of known approved portions of content;
   calculating a hash of the first portion of the content of the file;
   comparing the hash of the first portion of the content of the file with the whitelist of hashes of known approved portions of content; and
   when the hash of the first portion of the content of the file is included in the whitelist, including the first portion of the content of the file in the file;
   determining that content does not conform to the set of rules corresponding to the purported file type;
   flagging the file for quarantine;
   when the file is subject to quarantine, submitting the file to a scanning service for additional analysis to determine whether the file is to be released from quarantine;
   determining a first issue identifier (ID) for an issue as to why the content does not conform to the set of rules;
   accessing a file issue exclusion policy, the file issue exclusion policy specifying an approved file type and a second issue ID; and
   transmitting the file to a recipient instead of quarantining the file when approved file type in the file issue exclusion policy matches the purported file type and the second issue ID in the file issue exclusion policy matches the first issue ID.

10. The method according to claim 9, further comprising quarantining the file when the first issue ID does not match the second issue ID.

11. The method according to claim 9, wherein the file issue exclusion policy can specify a blocked file type and a third issue ID.

12. The method according to claim 9, wherein the file issue exclusion policy is set by the recipient.

13. The method according to claim 9, wherein the file issue exclusion policy applies to a plurality of recipients by corporate policy.

14. The method according to claim 9, further comprising:
comparing the purported file type with a file type policy;
when the file type policy specifies that the purported file type is blocked, disallowing the file; and
when the file type policy specifies that the purported file type is allowed, allowing the file to proceed to scanning.

15. The method according to claim 9, wherein scanning the content of the file using a set of rules corresponding to the purported file type includes:
identifying a first portion of the content of the file that can include malicious content;
accessing a file content policy;
when the file content policy specifies that the first portion of the content of the file is allowed, allowing the first portion of the content of the file to be included in the file;
when the file content policy specifies that the first portion of the content of the file is disallowed, quarantining the file; and
when the file content policy specifies that the first portion of the content of the file is to be sanitized, sanitizing the first portion of the content of the file.

16. The method according to claim 15, wherein accessing a file content policy includes:
accessing a whitelist of known approved portions of content;
comparing the first portion of the content of the file with the whitelist of known approved portions of content; and
when the first portion of the content of the file is included in the whitelist, including the first portion of the content of the file in the file.

17. The method according to claim 16, wherein accessing a file content policy further includes, when the first portion of the content of the file is not included in the whitelist, removing the first portion of the content of the file from the file.

* * * * *